US006850907B2

(12) United States Patent
Lutnick et al.

(10) Patent No.: US 6,850,907 B2
(45) Date of Patent: *Feb. 1, 2005

(54) AUTOMATED PRICE IMPROVEMENT PROTOCOL PROCESSOR

(75) Inventors: Howard Lutnick, New York, NY (US); Stuart Fraser, Armonk, NY (US); Bijoy Paul, North Brunswick, NJ (US)

(73) Assignees: Cantor Fitzgerald, L.P., New York, NY (US); CFPH, L.L.C., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/216,464

(22) Filed: Dec. 18, 1998

(65) Prior Publication Data

US 2002/0169703 A1 Nov. 14, 2002

Related U.S. Application Data

(63) Continuation-in-part of application No. 08/766,733, filed on Dec. 13, 1996, now Pat. No. 5,905,974.

(51) Int. Cl.$^7$ .............................................. G06F 17/60
(52) U.S. Cl. ....................................................... 705/37
(58) Field of Search ..................... 705/37, 39; 345/168, 345/172

(56) References Cited

U.S. PATENT DOCUMENTS

| | | | | |
|---|---|---|---|---|
| 2,134,118 A | | 10/1938 | Foss ........................ | 340/825.26 |
| 3,249,919 A | | 5/1966 | Scantlin .................. | 340/825.26 |
| 3,573,747 A | | 4/1971 | Adams et al. ................ | 705/37 |
| 3,581,072 A | | 5/1971 | Nymeyer ...................... | 705/37 |
| 3,656,148 A | * | 4/1972 | Belcher et al. ................ | 345/2 |
| 3,976,840 A | | 8/1976 | Cleveland et al. ........ | 379/93.02 |
| 4,412,287 A | * | 10/1983 | Braddock, III ................ | 705/37 |
| 4,674,044 A | * | 6/1987 | Kalmus et al. ............... | 705/37 |
| 4,677,552 A | | 6/1987 | Sibley, Jr. ..................... | 705/37 |
| 4,789,928 A | | 12/1988 | Fujisaki ........................ | 705/37 |
| 4,799,156 A | | 1/1989 | Shavit et al. .................. | 705/26 |
| 4,823,265 A | | 4/1989 | Nelson ......................... | 705/35 |
| 4,903,201 A | * | 2/1990 | Wagner ........................ | 705/37 |
| 4,980,826 A | | 12/1990 | Wagner ........................ | 705/37 |
| 5,038,284 A | * | 8/1991 | Kramer ........................ | 705/37 |
| 5,077,665 A | | 12/1991 | Silverman et al. ............ | 705/37 |
| 5,101,353 A | | 3/1992 | Lupien et al. ................. | 705/37 |
| 5,136,501 A | * | 8/1992 | Silverman et al. ............ | 705/37 |
| 5,168,446 A | * | 12/1992 | Wiseman ...................... | 705/37 |
| 5,243,331 A | | 9/1993 | McCausland et al. ........ | 345/172 |

(List continued on next page.)

FOREIGN PATENT DOCUMENTS

| | | | |
|---|---|---|---|
| EP | 0416482 | 3/1991 | ............. G07F/7/10 |
| EP | 0512702 | 11/1992 | ........... G06F/15/21 |
| GB | 2 258 061 | 1/1993 | ........... G06F/15/30 |
| JP | 62-256164 A | * 11/1987 | |
| WO | WO 95/26005 | 9/1995 | ........... G06F/17/60 |
| WO | WO 96/34356 | 10/1996 | ........... G06F/17/60 |

OTHER PUBLICATIONS

Massimb, M.N. et al., "Electronic Trading, Market Structure and Liquidity," Financial Analysis Journal, vol. 50, No. 1, pp. 39–50, Jan.–Feb. 1994.*

Fraser, S.A., "Declaration of Stuart A.Fraser," Submission to U.S.P.T.O., 2002.*

(List continued on next page.)

Primary Examiner—Nicholas David Rosen
(74) Attorney, Agent, or Firm—Fish & Neave

(57) ABSTRACT

A data processing system for implementing transaction management of auction-based trading for specialized items such as fixed income instruments. The data processing system provides a highly structured trading protocol implemented through a sequence of trading paradigms. The system employs a distributed computer processing network linking together a plurality of commonly configured program controlled workstations. The protocol and its program controlling logic enhances trading efficiency, rewards market Makers, and fairly distributes market opportunity to system users.

113 Claims, 13 Drawing Sheets

U.S. PATENT DOCUMENTS

| | | | |
|---|---|---|---|
| 5,297,031 A | | 3/1994 | Gutterman et al. |
| 5,297,032 A | | 3/1994 | Trojan et al. |
| 5,305,200 A | | 4/1994 | Hartheimer et al. |
| 5,361,199 A | | 11/1994 | Shoquist et al. .............. 705/26 |
| 5,375,055 A | | 12/1994 | Togher et al. |
| 5,463,547 A | | 10/1995 | Markowitz et al. ......... 715/507 |
| 5,689,652 A | * | 11/1997 | Lupien et al. ................. 705/37 |
| 5,710,889 A | | 1/1998 | Clark et al. .................. 235/379 |
| 5,715,402 A | | 2/1998 | Popolo ......................... 705/37 |
| 5,717,989 A | | 2/1998 | Tozzoli et al. |
| 5,727,165 A | * | 3/1998 | Ordish et al. ................. 705/37 |
| 5,787,402 A | * | 7/1998 | Potter et al. .................. 705/37 |
| 5,794,219 A | | 8/1998 | Brown ......................... 705/37 |
| 5,826,244 A | | 10/1998 | Huberman .................... 705/37 |
| 5,832,462 A | | 11/1998 | Midorikawa et al. ......... 705/35 |
| 5,835,896 A | | 11/1998 | Fisher et al. .................. 705/37 |
| 5,842,178 A | | 11/1998 | Giovannoli .................... 705/26 |
| 5,873,071 A | * | 2/1999 | Ferstenberg et al. .......... 705/37 |
| 5,890,138 A | | 3/1999 | Godin et al. .................. 705/26 |
| 5,905,975 A | * | 5/1999 | Ausubel ...................... 705/37 |
| 5,915,209 A | | 6/1999 | Lawrence ................... 340/3.7 |
| 5,924,082 A | | 7/1999 | Silverman et al. ............ 705/37 |
| 5,926,801 A | * | 7/1999 | Matsubara et al. ........... 705/37 |
| 5,987,419 A | * | 11/1999 | Hachino et al. ................ 705/1 |
| 6,014,627 A | * | 1/2000 | Togher et al. ................. 705/1 |
| 6,016,483 A | * | 1/2000 | Rickard et al. ............... 705/37 |
| 6,029,146 A | * | 2/2000 | Hawkins et al. .............. 705/35 |
| 6,134,535 A | * | 10/2000 | Belzberg ...................... 705/37 |
| 6,151,588 A | * | 11/2000 | Tozzoli et al. ................. 705/37 |
| 6,230,146 B1 | * | 5/2001 | Alaia et al. .................... 705/37 |
| 6,247,000 B1 | * | 6/2001 | Hawkins et al. .............. 705/37 |
| 6,263,321 B1 | | 7/2001 | Daughtery, III .............. 705/36 |
| 6,282,521 B1 | * | 8/2001 | Howorka ...................... 705/37 |
| 6,311,178 B1 | * | 10/2001 | Bi et al. ......................... 707/3 |
| 6,343,278 B1 | * | 1/2002 | Jain et al. ...................... 705/37 |
| 6,405,180 B2 | | 6/2002 | Tilfors et al. ................. 705/37 |
| 6,421,653 B1 | * | 7/2002 | May ............................. 705/37 |
| 6,505,174 B1 | * | 1/2003 | Keiser et al. .................. 705/37 |
| 6,519,574 B1 | * | 2/2003 | Wilton et al. ................. 705/35 |
| 2002/0023041 A1 | | 2/2002 | Brett ............................ 705/37 |
| 2002/0082976 A1 | * | 6/2002 | Howorka ...................... 705/37 |
| 2002/0091626 A1 | | 7/2002 | Johnson et al. ............... 705/37 |
| 2003/0050888 A1 | | 3/2003 | Satow et al. .................. 705/37 |

OTHER PUBLICATIONS

Bollinger, J., "Declration of James Bollinger," submission to U.S.P.T.O., Feb. 19, 2002.*

Lutnick, H.W., "Declaration of Howard W.Lutnick," submission to U.S.P.T.O., Feb. 5, 2002.*

Ruben, B.N., "Declaration of Bradley N. Ruben," submission to U.S.P.T.O., Feb. 5, 2002.*

Paul, B., "Declaration of Bijoy Paul," submission to U.S.P.T.O., Jan. 31, 2002.*

Anon., "Exhibit for Fraser and Paul Declarations," Exhibits A–P, submission to U.S.P.T.O., various dates up to May 1995 (some undated).*

"EJV Aims to Launch Analytics Service by Year End," BondWeek, vol. 11, No. 38, p. 9, Sep. 23, 1991.

"EJV Snares Sanction for Autotrade System," BondWeek, vol. 11, No. 16, p. 13, Apr. 22, 1991.

Ray, Christina I., The Bond Market, pp. 59–69, 1993.

Umlauf, Steven R. "Information Asymmetries and Security Market Design: An Empirical Study of the Secondary Market for U.S. Government Securities," The Journal of Finance, vol. 46, No. 3, pp. 929–953, Jul. 1991.

"U.S. Government Securities—More Transaction Information and Investor Protection Measures Are Needed," United States General Accounting Office, Report to Congressional Committees, pp. 1–10, 97–100, (Sep. 1990).

Adam, Nigel, "Exxon's Quiet Auction Brings Uproar to Wall Street," Euromoney pp. 39–45, (Dec. 1982).

Angrist, Stanley W., "Iowa Market Takes Stock of Presidential Candidates," The Wall Street Journal, Money & Investing Update, Aug. 28, 1995.

Aversa, Jeannine, "Bidding In High–Tech Airwaves Auction to be Handled by Computer, of course," Buffalo News, p. A–10, Dec. 5, 1994.

Bailey, Dee Von, et al., "Identifying Buyer Market Areas and the Impact of Buyer Concentration in Feeder Cattle Markets Using Mapping and Spatial Statistics," American Journal of Agricultural Economics, vol. 77, No. 2, pp. 309–318, May 1995.

Bailey, DeeVon, et al., "A Comparison of Video Cattle Auction and Regional Market Prices," American Agricultural Economics Association, pp. 465–475, (May 1991).

Banatre, Jean–Pierre, et al., "The Design and Building of Enchere, A Distributed Electronic Marketing System," Communications of the ACM, vol. 29, No. 1, pp. 19–29, (Jan. 1986).

Banatre, Michel, "Enchere: A Distributed Auction Bidding System, External Characteristics and General Design Considerations," The International Computing Symposium—Systems Architecture, pp. 10–21, 1981.

Banatre, Michel, "Distributed Auction Bidding System," Computer Communications, vol. 4, No. 4, pp. 179–186, (Aug. 1981).

Banning, Edward, "About Coins Rare Coin Auctions Enter the Video Technology Era," May 23, 1987, The Globe and Mail, p. E18.

Batchelor, Charles, "Reuters Takes on the Stock Exchange," Financial Times, UK News, May 23, 1985.

Beam, Carrie, et al., "CXN: A Case Study," CMIT Working Paper 97–WP–1025, pp. 1–13.

Beam, Carrie, et al., "Electronic Negotiation Through Internet–Based Auctions," CITM Working Paper 96–WP–1019, pp. 1–35, Dec. 1996.

Beeder, David C., "Video Auction Attracts 300 Cattlemen," The Omaha World–Herald, Feb. 8, 1985.

Belsie, Laurent, "Details and Delays Bog Down FCC Bid to Try New Auction System Former us fo Lottery Fails to build Base for new Technologies," Christian Science Monitor, p. 8, Apr. 25, 1994.

Berss, Marcia, "With CapitalLink, the commercial bankers would take another step onto Wall Street's turf. Merrill Lynch is fighting back," Forbes, pp: 42–43, (May 28, 1990).

Bertin, Oliver, "Cattle Auctions are on the Road to Extinction," The Globe and Mail, p. B1, Mar. 15, 1982.

Bertsekas, D.P., et al., "A forward/reverse auction algorithm for asymmetric assignment problems," Computational Optimization and Applications, vol. 1, No. 3, Dec. 1992, Abstract.

Bichler, Martin, et al., "Multi–Attribute Auctions for Electronic Procurement," available at www.econjit.edu/bartel/NegroPap/multiattributeauctions.pdf,1999, (13 pages).

Bikchandani, Sushil, et al., "The Economics of Treasury Securities Markets," Journal of Economic Perspectives, vol. 7, No. 3, pp. 117–134, (Summer 1993).

Bisbee, Dana, "Museum Fund–Raiser is Sold on the Internet," Boston Herald, May 22, 1995, p. 33.

Bollestev, Tim, et al., "Some Effects of Restricting the Electronic Order Book in an Automated Trade Execution System," an Article in *The Double Auction Market*, pp. 221–252, 1993.

Booker, Ellis, "Mega Real Estate Auction Counts on Imaging," Computerworld, Dec. 7, 1992.

Brown, David, "Bids go Sky High at Satellite Cattle Sale," The Daily Telegraph, Oct. 31, 1992, p. 9.

Bryant, Adam, "Looking for Low–Price Airline Tickets?— Take Quick Trip to Internet Auction," The Commercial Appeal (Memphis), Business, p. 5B, May 14, 1996.

Bryant, Adam, "Am I Bid Six? Click to Bid Six!; Airlines Are the Latest to Move to On–Line Auctions," The New York Times, p. D1, May 13, 1996.

Byrne, John, "Special Feature: Is the Reform Worse Than the Problem? A Stock Market Chief Takes a Second Look at the SEC's History of Breaking up Dealer Monopolies," Traders Magazine, Dec. 1, 1999.

Bunker, Ted, "How Auction Technology Sped and Enhanced Sale of Radio Licenses," Investor's Business Daily, p. A3, Feb. 24, 1995.

Burden, Peter, "Pig Men Plug Into Computers," Australian Financial Review, p. 37, Sep. 19, 1984.

Burrus, Victoria, "The Change Page–The Virtual Stockyard Herd Instincts/Today's Ranchers are as Likely to be Punching Computers as Steers. The Electronic Auction has become an Established part of the Cattle Business—and the Salvation of One Auction Company," The Globe and Mail, p. B28, Sep. 27, 1994.

Carey, Christopher, "Firm Offers Auction for Airline Tickets," St. Louis Post–Dispatch, Inc., p. 1B, Aug. 7, 1991.

Carlsen, Clifford, "From Airline Tickets to Human Organs, the Electronic Markets are Booming," San Francisco Business Times, vol. 3, No. 50, Sec. 1, p. 17, Aug. 14, 1989.

Cassady, Jr., Ralph, *Auctions and Auctioneering*, "Modern Communication Systems," pp. 193–208, 1967.

Castro, Laura L., "Fish Sales Flounder in Brooklyn," City Newsday, p. 13, Dec. 19, 1987.

Cavalier, Rodney, "Micro–Chip V. Saleyard," Australian Financial Review, p. 47, Aug. 15, 1988.

Chamberlain, Art, "Cyber–Shopping Made Safe Encrypted System Created to Block Hackers from Stealing Credit Card Numbers on the Internet," The Toronto Star, May 25, 1996, p. C3.

Charlier, Marj, "Video Auctions Could Spell End for Stockyards," The Wall Street Journal, Nov. 2, 1988.

Charton, Scott, "Video Livestock Auctions Don't Dirty Buyers' Boots," Houston Chronicle, p. 3, Feb. 18, 1991.

Cole, Jeff, "Fare Bidding Plan Could Be the Ticket," St. Paul Pioneer Press Dispatch–Business, Mar. 11, 1990 (2 pages).

Cohen, Kalman, et al., "An Electronic Call Market: Its Design and Desirability," in *The Challenge of Information Technology for the Securities Markets Liquidity, Volatility, and Global Trading*, pp. 15–57, 1989.

Cohen, Norma, "Day of Reckoning for Stock Exchange: Board to Decide on Launch of an Alternative to the Quote–Driven Trading System, "Financial Times (London), p. 15, Nov. 30, 1995.

Cohen, Norma, "Stock Exchange Rejects Trading Shake–Up," Financial Times (London), Oct. 23, 1995, p. 22.

Cohen, Norma, "Stock Exchange to Debate Hybrid Market Plans," Financial Times (London), pp. 6, Nov. 27, 1995.

Colleman, Zach, "Electronic Trading System Matches Buyers, Sellers," *Atlanta Business Chronicle*, vol. 20, No. 12, p. 37A, Aug. 22–28, 1997.

Coggan, Philip, Weekend Money: Making Sense of the market Maze—Where's best to invest?, Nov. 4, 1995, p. 1.

Connor, John, "House Panel Wants Treasury To Protect Computer Auction System," *Dow Jones News Service–Ticker*, Jul. 8, 1993.

Connor, John, "GAO—Automated Tsy Auctions Cut Time, But Problems Remain," *Dow Jones News Service–Wall Street Journal Combined Stories*, Sep. 6, 1994.

Court, Chris, "Armchair Market Plan For Livestock Farmers," Press Association Newsfile, Nov. 8, 1992.

Court, Chris, "Satellite Link Takes Armchair Market to Farmers," Press Association Newsfile, Jul. 12, 1992.

Court, Chris, "Farmers Buy Cattle by Satellite," Press Association Newsfile, May 20, 1993.

DelRosso, Laura, "Marketel says It Plans to Launch Air Fare 'auction' in June," *Travel Weekly*, vol. 50, No. 34, Apr. 29, 1991, (2 pages).

DeSilva, Janet, "Wool Unravels the Past," Australian Financial Review, p. 1, May 5, 1989.

Domowitz, Ian, "The Mechanics of Automated Trade Execution Systems," *Journal of Financial Intermediation*, vol. 1, pp. 167–194 1990.

Domowitz, Ian, "A Taxonomy of Automated Trade Execution Systems," *Journal of International Money and Finance*, vol. 12, pp. 607–631, 1993.

Domowitz, Ian, "An Exchange Is a Many Splendored Thing: The Classification and Regulation of Automated Trading Systems," in *The Industrial Organization and Regulation of the Securities Industry*, pp. 93–123, 1996.

Domowitz, Ian, "Automating the Continuous Double Auction in Practice: Automated Trade Execution Systems in Financial Markets," an Article in *The Double Auction Market*, pp. 27–60, 1993.

Domowitz, Ian, "Automating the Price Discovery Process: Some International Comparisons and Regulatory Implications," *Journal of Financial Services Research* pp. 305–326, 1992.

Domowitz, Ian, "Equally Open and Competitive: Regulatory Approval of Automated Trade Execution in the Futures Market," *The Journal of Futures Markets*, vol. 13, No. 1, pp. 93–113, 1993.

Dyson, Ester, "Information, Bid and Asked," *Forbes* Aug. 20, 1990, p. 92.

Economides, Nicholas, et al., "Electronic Call Market Trading," *The Journal of Portfolio Management*, pp. 10–18, Spring 1995.

Fainaru, Steve, "What Overnight Market? Heralded as Wave of the Future, After–hours Stock Trading Has Been Greeted With Yawns," The Boston Globe, p. A1, Jul. 31, 1994.

Feinberg, Andrew, "Fears of Inflation aren't the Only Thing Driving the Bull Market for Stamps, *STAMPEDE!*," Venture, pp. 26–27, (Sep. 1987).

Feldman, Joan M., "To Rein in Those CRSs," Air Transport World, at 89, Dec. 1991, (7 pages).

Ferris, Stephen P., "Automated Trade Execution and Trading Activity: The Case of the Vancouver Stock Exchange," *Journal of International Financial Markets*, Institutions and Money, vol. 7, pp. 61–72, 1997.

Field, Michael, "Buy Equity and Stay Married," Euromoney, n318, pp. 74–76, Oct. 1995.

Fischetti, Mark, "The Rise of E–Business," Think Research Magazine, Dec. 26, 1999 (3 pgs.).

Fowler, David, "The Future of the Internet as a Business Marketing Platform," Telecommunications, (Oct. 1994), p. 77.

Fox, Nicolette, "The Calm Way of Buying and Selling Livestock," Sydney Morning Herald, p. 23, Oct. 10, 1988.

Francioni, Reto, "The German Equities Market," Chapter 30, pp. 473–484 in *Global Equity Markets: Technological, Competitve, and Regulatory Challenges*, ed. Robert A Schwartz, 1995.

Franklin, Matthew K., et al., "The Design and Implementation of a Secure Auction Service," *Transactions of the American Nuclear Society*, vol. 62, pp. 2–14, Sheraton Washington Hotel, Washington, D.C. (Nov. 11–15, 1990).

Frazier, Deborah, "Cattle Star in Stock Show's Satellite Video Auction Two–day Bellringer Brought $30 million as ranchers from 35 States Tuned in," Rocky Mountain News, Jan. 14, 1995, p. 50A.

Frino, Alex, et al., "The Liquidity of Automated Exchanges: New Evidence from German Bund Futures," *Journal of International Financial Markets, Institutions and Money*, vol. 8, pp. 225–241, 1998.

Fritschner, Sarah, "Matchmaker for The Horsey Set," *American Demographics*, pp. 48–50, (Jun. 1988).

Gaines, B.R., et al., "Minicomputers in Security Dealing," Computer, vol. 9, No. 9, pp. 6–15, Sep. 1976.

Gapper, John, "Stock Exchange Rival has Slow Start," Financial Times (London), Dec. 27, 1995, p. 5.

Garbade, Kenneth D., "The Effect of Interdealer Brokerage on the Transactional Characteristics of Dealer Markets," *Journal of Business*, vol. 51, No. 3, pp. 477–498, (Jul. 1978).

Gilbertson, Dawn, "Wall Street West; Arizona Stock Exchange Battles for More Volume," The Phoenix Gazette, p. B5, Mar. 30, 1993.

Goodhart, Charles et al., "One Day in Jun. 1993: A Study of the Working of the Reuters 2000–2 Electronic Foreign Exchange Trading System," pp. 107–182, *The Microstructure of Foreign Exchange Markets*, 1996.

Goodman, Ann, "Back to the Future," Wall Street & Technology, vol. 9, No. 6, pp. 30–36 and 71, Feb. 1992.

Gordon, Pat, "New Brand of Video Cattlemen move'em out by Making Movies for Livestock Auctions," The Dallas Morning News, p. 15A, Nov. 2, 1987.

Greenberg, Peter S., "The Savvy Traveler: Lower Air Fares for Consumers not in the Cards; Airline: Remember when it cost $16 to Fly from Los Angeles to San Francisco? Then you Remember the days before deregulation. Since then, prices have soared," Los Angeles Times, part L, p. 2, Jul. 8, 1990.

Grody, Allan D., et al., "Global Electronic Markets, A Preliminary Report of Findings," Working Paper Series, STERN #IS–95–18, May 31, 1994, pp. 1–35.

Grody, Allan D., et al., "Past, Present and Future: The Evolution and Development of Electronic Financial Markets," Working Paper Series IS–95–21, Nov. 1993, Odd–numbered pages missing.

Grover, Christopher F., "What Price, Art?," *CD–Rom World*, pp. 72–73, (Sep. 1994).

Hamon, Jacques, et al., "Market Structure and The Supply of Liquidity," Chapter 5, pp. 76–89 in *Global Equity Markets: Technological, Competitve, and Regulatory Challenges*, ed. Robert A Schwartz, 1995.

Handa, Puneet, et al., "The Ecology of an Order–Drive Market," *The Journal of Portfolio Management*, pp. 47–55, Winter 1998.

Hands, Puneet, et al., "How Best to Supply Liquidity to a Securities Market," *The Journal of Portfolio Management*, pp. 44–51, Winter 1996.

Hansell, Saul, "Will Bill Donaldson Go the Way of Gorbachev," Institutional Investor, Feb. 1992.

Harris, Lawrence, *Monograph Series in Finance and Economics–Liquidity, Trading Rules and Electronic* Trading Systems, pp. 1–59, 1991.

Harverson, Patrick, "Age of Automation Reaches New York Bond Auctions—From Today, Dealers Will Bid By Computer on the World's Largest Securities Market," Financial Times (London), p. 33, Apr. 29, 1993.

Harverson, Patrick, "Bond Auctions Go Modern: New York Computers take over from Sheets of Paper and Boxes," *The Financial Post Daily*, p. 50 May 4, 1993.

Hawkins, Phil, et al., "Illiquid Bonds, Stocks To Hit Auction Block,"*Investor's Daily Inc.*, p. 30, Jun. 15, 1990.

Heck, Eric Van, et al., "Experiences with Electronic Auctions in the Dutch Flower Industry," Electronic Markets, vol. 7, No. 4, pp. 29–34, 1977.

Henkel, Tom, "Automated Stock Exchange Replacing Humans," *ComputerWorld*, p. 36 (Feb. 14, 1983).

Hollington, Simon, "Armchair Auctions Set to Replace Market Day," The Independent (London), Jul. 6, 1992.

Horowitz, Jed, "AZX Tries Again, Hoping New Auction Lures Traders," Investment Dealers' Digest, Jun. 9, 1997 (2 pages).

Inhaber, Herbert, "How to Solve the Problem of Siting Nuclear Waste," pp. 61–62, MRS Facility: Would Repository Collocation Be a Solution?.

Jackson, Ted, "Bloomberg's Next Step: The Instinet Killer?," *Wall Street & Technology*, vol. 14, No. 8, pp. 34–38, Aug. 1996.

Jones, Chris, "Trade'ex readies Java–based Market Maker," *Infoworld*, (Oct. 28, 1996).

Kambil, Ajit et al., "Information Technology, Competition and Market Transformations: Re–engineering the Dutch Flower Auctions," Working Paper Series, STERN#IS–95–1, (Jan. 1995).

Kedrosky, Peter, "Intenet Liquidators:www.internetliquidators.com," pp. 1–28, 1997.

Killian, Raymond L., et al., "The Effect of Liquidity on Electronic Order Routing," Chapter 4, pp. 67–75 in *Global Equity Markets; Technological, Competitve, and Regulatory Challenges*, ed. Robert A Schwartz, 1995.

Klein, Lisa, "*TRADE'ex: The Stock Exchange of the Computer Industry*", Harvard Business School document 9–597–99, Sep. 22, 1998, (14 pages).

Klein, Stephan, "Introduction to Electronic Auctions," Electronic Markets–International Journal of Electronic Markets, vol. 7, No. 4, 1997, pp. 3–23.

Klemperer, Paul, "Auction Theory: A Guide to the Literature," *Journal of Economic Surveys*, vol. 13, No. 3, pp. 227–286, (Jul. 1999).

Korper, Steffano, et al., "Auction Technology," *The E–Commerce Book, Building the E–Empire*, Auction Technology, Chapter 10, pp. 211–230, 2000.

Kuklenski, Valerie, "Rock Art for Sale on Computer Web," *United Press International*, Apr. 24, 1995.

Kumar, Manoj, et al., "Internet Auctions," IBM Research Division, available at www.research.imb.com/iac/papers/auction.fp.pdf.

Kuttner, Robert, "Computers may turn the World into One Big Commodities Pit," Business Week, p. 17, Sep. 11, 1989.

Lacy, Allen, "Gardening: Bidding for Blossoms," The Wall Street Journal, Feb. 22, 1984.

Lee, Ho Geun, et al., "AUCNET: Electronic Intermediary for Used–Car Transactions," Focus Theme, International Journal of Electronic Market, pp. 24–28, Dec. 1997.

Lee, Ho Geun, "Do Electronic Marketplaces Lower the Price of Goods?," Communications of the ACM, vol. 41, No. 1, Jan. 1998, pp. 73–80.

Lee, Ruben, What is an Exchange? The Automation, Management, and Regulation of Financial Markets, pp. 279–321 and 351–355, 1998.

Leinweber, David et al., "A Little Artificial Intelligence Goes a Long Way on Wall Street," Institutional Investor, Winter 1996.

Leinweber, David, "Using Information from Trading in Trading and Portfolio Management," The Journal of Investing, The Journal of Investing, vol. 4, No. 2, p. 40, Summer 1995.

Levecq, Hugues, et al., "Electronic Trading Systems: Strategic Implications of Market Design Choices," Working Paper, STERN #IS–95–19, 1995, Even–numbered pages missing.

Lewis, Peter H., "Auction of Collectibles on the Internet," The New York Times, p. D4, May 23, 1995.

Littlefair, T., "Homelink: a unique service," Computer Bulletin, pp. 12–13, (Jun. 1986).

Lux, Hal, "Institutional Stock Exchange Puts Order Book on the Web; AZX Experiments with a New Way to Reach Investors," Investment Dealers' Digest, p. 6, Nov. 20, 1995.

Lux, Hal, "New Arizona Exchange Opens with Decent, Steady Volume; Trading Systems Increase Pressure on Exchanges," Investment Dealers' Digest, p. 6, Apr. 20, 1992.

Lux, Hal, "Stock Exchanges Hold Talks on New Joint Trading System; Inventors could Gain New Access to Equity Floors," Investment Dealers' Digest, p. 6, Dec. 7, 1992.

Lux, Hal, "Vision Test: Can Steve Wunsch Build a Better Exchange?" Investment Dealers' Digest, p, 18, Sep. 17, 1990.

MacConnell, Sean, "Video Stars for New Pastures," The Irish Times, Jul. 24, 1993, p. 13.

Madden, Bartley et al., "Structural Changes in Trading Stocks," The Journal of Portfolio Management, Fall 1993 (11 pages).

Markoff, John, "Breaking Up Computer Traffic Jams," The Orange County Register, p. d5, May 25, 1989.

Markoff, John, "Can Xerox Auction Off Hot Air?" The New York Times, p. D5, Jun. 24, 1996.

Markoff, John, "Spawning a New Way to Buy Time," Sydney Morning Herald, May 8, 1989, p. 22.

Massimb, Marcel, et al., "Electronic Trading, Market Structure and Liquidity," Financial Analysts Journal, vol. 50 No. 1, pp. 39–50, Jan.–Feb. 1994.

Mastery, Mary Ann "Going, Going, Gone, Electronic bidding devices are usurping physical contact at Japan's car auctions," Automotive News, (Nov. 26, 1990) p. 6.

Matthew, Janet, "OTC Success Spurs Specialized Trading Systems," Wall Street Computer Review, pp. 26–28 and 32–38, Sep. 1989.

Maynard, Therese H., "What is an Exchange?"—Propietary Electronic Securities Trading Systems and The Statutory Definition of an Exchange, Washington and Lee Law Review, vol. 49, No. 3, Summer 1992, pp. 833–912.

McCabe, Kevin et al., "Institutional Design for Electronic Trading," Chapter 8, pp. 121–156 in Global Equity Markets: Technological, Competitve, and Regulatory Challenges, ed. Robert A Schwartz, 1995.

McGookin, Stephen, "Media Futures: Cyber Sightings," Financial Times (London), Oct. 30, 1995.

McInish, Thomas, H., et al., "Hidden Limit Orders on the NYSE," The Journal of Portfolio Management, pp. 19–26, Spring 1995.

McMillian, John, "Selling Spectrum Rights," Journal of Economic Perspectives, vol. 8, No. 3, pp. 145–162, Summer 1994.

Meissner, Frank, "Centralized electronic marketing systems improve trading of agricultural commodities," Marketing News, at 14 (Nov. 27, 1981).

Metcalfe, Rod, "Cattle Sale on Videotape," Australian Financial Review, Mar. 22, 1985, p. 26.

Michaels, Jenna, "Customized Listed Contracts," Wall Street & Technology, vol. 10, No. 10, pp. 56–62, May 1993.

Milgrom, Paul, "Auctions and Bidding: A Primer," Journal of Economic Perspectives, vol. 3, No. 3, pp. 3–22, Summer 1989.

Miller, Greg, "Celebrity Auctions are Going, Going . . . Online," Los Angeles Times, May 13, 1996.

Miller, Ross M., "The Design of Decentralized Auction Mechanisms That Coordinate Continuous Trade in Synthetic Securities," Journal of Economic Dynamics and Control, vol. 14, pp. 237–253, (1990).

Miniclier, Kit, "Livestock Buyers to put $50 Million on the line 'Home on the Range' to be Sold Via Film," Denver Post, p. 23A, Jan. 9, 1994.

Mitchell, Constance, "Big Junk Bond—Players to Try Weekly Auction," The Wall Street Journal, p. C15, Jun. 14, 1990.

Mitchell, Russell, "The Corporation How GE is Electrifying the Auto–Auction Business—GECC's Deep Pockets are helping to Make It No. 1," Business Week, p. 68(3 pgs.), May 16, 1988.

Mitchener, Brandon, "On Election Bourse, Race Is Wide Open; German Contest Remains Close for Buyers of Political 'Shares'," International Herarld Tribune (Neuilly–sur–Seine, France), Oct. 13, 1994.

Montgomery, Johnnye, "MOOTV: Airwave Auction Technology Transforms a Decades–old Tradition," The Dallas Morning News, p. 33A, Jan. 6, 1991.

Moon, Youngme, "Onsale, Inc.," Article 5–500–022 from Harvard Business School, Teaching Note, pp. 1–14, Aug. 23, 1999.

Moon, Youngme, "Onsale, Inc." Article 9–599–091 from Harvard Business School pp. 1–17, May 17, 1999.

Munro, Don et al., "A New Way to Purchase Travel," Business Travel News, Issue No. 158, Nov. 6, 1985.

Munshi, Jamal, Stock Exchange Automation, pp. 1–48, 73–94, 1994.

Noack, David, "First Stop for Some Lies in Cyberspace," The Record, p. T01, Feb. 19, 1995.

Neo, Boon Siong, "The implementation of an electronic market for pig trading in Singapore," Journal of Strategic Information Systems, vol. 1, No. 5, pp. 278–287, (Dec. 1992).

Nomani, A., "Public May Submit Bids to get Bargain Rates," The New York Times Company: Abstracts, Wall Street Journal, Sec. 2, p. 1, Aug. 1, 1989.
Nomani, Asra Q., "Airline Industry Cutting More Fares for Fall Vacations," Wall Street Journal, p. B1, Aug. 21, 1991.
Nelson, Janet, "Airlines Relaxing Policy on No–Refund Tickets," The New York Times, sec. 5, p. 3, Sep. 22, 1991.
Nyberg, Bartell, "Sale at Video Auction a Record but Prices Hurt by Chicago Probe," Denver Post, p. 1, Jan. 20, 1989.
Ogura, Masao, "Here Come The Little Guys!," Tokyo Business, pp. 4–11, (Feb. 1995).
O'Sullivan, Orla, "Auctions to Be Computer–Orchestrated," National Thrift News, Inc., p. 15 Mar. 14, 1994.
Parameswaran, Manoj, et al., "Electronic Markets and the Logistics of Digital Products," Center for Research in Electronic Commerce The University of Texas, Austin, Jan. 1999, (16 pages).
Parkes, David C., "iBundle: An Efficient Ascending Price Bundle Auction," pp. 148–157, available at www.eecs.harvard.edu/econs/pub/ibundle.pdf, (1999).
Pelline, Jeff, "Going Once, Going Twice, Going Online," The San Francisco Chronicle, Business: p. B1, Nov. 13, 1995.
Pelline, Jeff, "Travelers Bidding On Airline Tickets SF Firm Offers Chance for Cut–Rate Fares," The San Francisco Chronicle, p. A4, Aug. 19, 1991.
Peltz, Michael, "Instinet's Identity Crisis," Institutional Investor, p. 53, Nov. 1995.
Piton, Margaret, "Budget Travel—New Service gives access to a choice of airline fares U.S. Flights only. A bidding system called Bookit sounds complicated and requires access to a fax machine, but it has advantages," The Globe and Mail, p. F5, Sep. 21, 1991.
Quiddington, Peter, "Fish Markets Plan Auctions On–Line," Sydney Morning Herald, p. 4, Mar. 28, 1988.
Reed, Dan, "Airlines Go On Line to Cut Costs; Carriers try to Fill More Seats, Lowering Ticketing Expenses," The Fort Worth Star–Telegram–Business, p. 1, Apr. 13, 1996.
Reiley, David Lucking, Auctions on the Internet: What's Being Auctioned, and How?, Aug. 14, 1999, p. 1–54.
Reiley, David Lucking, "Vickrey Auctions Predate Vickrey," Journal of Economic Perspectives, pp. 1–10, Jun. 1999.
Resnick, Paul, et al., "Roles for Electronic Brokers," available at http://ccs.mit.edu/papers/CCSWP179.html, printed on Sep. 8, 1997 (11 pages).
Rockoff, Todd E. et al., "Design of an Internet–Based System for Remote Dutch Auctions," Internet Research: Electronic Networking Applications and Policy, vol. 5, No. 4, pp. 10–16, (1995).
Rohrer, Julie, "Steve Wunsch's Uphill Battle," Institutional Investor, pp. 103–107 (Dec. 1988).
Rosenblatt, Robert A., "New Treasury Auction System Is Criticized Securities: Agency Plans to Begin Computerized Operations Today Despite GAO Objections," Los Angeles Times, p. 1, Apr. 29, 1993.
Rosenthal, Mindy, "Electronic Mortgage–And Asset–Backed Trading System Nears Launch," Institutional Investor, Inc.—Bondweek, vol. XI, No. 18, p. 1, May 6, 1991.
Rust, John, et al., "Behavior of Trading Automata in a Computerized Double Auction Market," an Article in The Double Auction Market, pp. 155–198, Addison–Wesley, 1993.
Sales, Robert, "Nasdaq ECNs: A Brave New World," Wall Street & Technology, Vo. 16, No. 8, pp. 28–32, Aug. 1998.

Sales, Robert, "Sec to Wall Street . . . Play Fair with the Little Guy," Wall Street & Technology vol. 15, No. 1, p. 42–48, Feb. 1992.
Sammer, Harald W., "Online Stock Trading Systems: Study of an Application," (2 pages).
Sanders et al., "Auctioning by Satellite using Trusted Third Party Security Services," in "Information Security the Next Decade, Proceedings of the IFIP TC11 Eleventh International Conference on Information Security, IFIP/Sec '95," pp. 205–219, 1995.
Schmerken, Ivy, "Oh What Memories!," Wall Street & Technology, Jun. 18, 2002.
Schneider, Anna Rubino, "Information Processing High Tech Comes to the Tulip Bed—Facing Competition and High Costs, The Dutch are Using Computers to turn Farms into Flower Factories," Business Week, p. 72D, May 12, 1986.
Schroeder, Mary, "An Insider's Guide," Securities Industry News, Jan. 17, 2000.
Searles, Denis, M., "No need to hoof it to Video Cattle Auction Satellite Technology from Colorado firm Connects Buyer, Seller," Rocky Mountain News, p. 3A, Apr. 30, 1993.
Segev, Arie, et al., "Brokering Strategies in Electronic Commerce Markets," pp. 167–176, presented at ACM Conference on Electronic Commerce, Nov. 1999.
Selby, Beth, et al., "Steve Wunsch's Wall Street Southwest," Institutional Investor, p. 12, Feb. 1992.
Shahan, Catherine, "Public Television Station HOlds On–line Computer Auctions," Feb. 11, 1987.
Sheppard, Robert, "Western Cattle Make Star Trek to help Bridge Regional Gap," The Globe and Mail, p. 14, Oct. 29, 1983.
Sinclair, Joseph T., eBay the Smart Way–Selling, Buying, and Profiting on the Web's #1 Auction Site, pp. 3–11, 1999.
Sirri, Erik, "Jefferies & Company: ITG," Article 9–294–952 from Harvard Business School, pp. 1–24, Nov. 1, 1993.
Smith, Carrie, R., "Futures Exchanges Go for Global Links," Wall Street & Technology, vol. 12, No. 13, pp. 20–24, May. 1995.
Smith, Terry, "The Good, The Bad and The Ugly," Management Today, pp. 54–60, Sep. 1995.
Stutz, Bruce, "New York Forum About Town—Fishport's Bait Nets a Loss," Newsday, p. 66, Feb. 2, 1990.
Sviokla, John, et al., "AUCNET: Teaching Note," Harvard Business School Publication 5–396–280, Feb. 21, 1997 (25 pages).
Szabo, Nick, "Smart Contracts," pp. 1–8, 1994, available at http://szabo.best.vwh.net/smart.contracts.html.
Taylor, John, "Selling Without the Smelling Televised Auction will sell About 25, 000 Head of Cattle," The Omaha World–Herarld, Bulldog, Mar. 23, 1988.
Thomas, Charles M., "Real–time computer auction bows," Automotive News, p. 52, (Feb. 7, 1994).
Tomkins, Richard, "Passengers take a Seat at the Internet Auction: Richard Tomkin on Airlines' Ventures into Cyberspace in their quest to fill unused Capacity," The Financial Times Limited, Financial Times (London), Jun. 17, 1996.
Toner, Ann, "Hogs Sold in High–Tech Bidders Linked Through Satellite," The Omaha World–Herlad, p. 3M, Sep. 11, 1994.
Varian, Hal R., "Economic Mechanism Design for Computerized Agents," First USENIX Workshop on Electronic Commierce, pp. 13–21, Jul. 11–12, 1995.

Wallace, Anise C., "Market Place: A Wary Response to 'Junk' Auction," The New York Times Company, Aug. 13, 1990, p. D4.

Wang, Jianxin, "Asymmetric Information and the Bid–ask Spread: an Empirical Comparison between automated order execution and open outcry auction," *Journal of International Financial Markets, Institutions and Money*, vol. 9, pp. 115–128, 1999.

Warbelow, Art, et al., "AUCNET: TV Auction Network System," Harvard Business School Publication 9–190–001, Rev. Apr. 12, 1996, originally published Jul. 19, 1989 (15 pages).

Warbelow, Arthur W., Electronic Market Access Forums in Non–Homogeneous Markets: An Exploratory Study of Environmental, Market Structure, and Managerial Considerations, (A thesis presented by Arthur W. Warbelow, Harvard University), (1992).

Ware, James, P., *The Search for Digital Excellence*, McGraw–Hill, pp. 235–243, Jul. 8, 1998.

Warneke, Kent, "Omaha to See First Video Cattle Sale Today," The Omaha World–Herald, Bulldog, Feb. 7, 1985.

Waters, Richard, "The Price of a Share in the Cake/Are Structural Problems in the US Stock market Being Obscured?" Financial Times (Lodnon), p. 16, Jan. 31, 1994.

Watson, Catherine, "Dutch Flower Auctions are Fast–Paced, Mystery Blend of Nature, Technology," Star–Tribune Newspaper of the Twin Cities Mpls.—St. Paul, p. 13G, Feb. 12, 1995.

Wayner, Peter, "Time and Money," BYTE, pp. 252–258, Apr. 1990.

Wernle, Bradford, "Aucnet Plans New Channel for Used Cars," Crain Communications, Inc., Section: News: Pg 54, Feb. 19, 1996.

Williams, Arlington, W., "Computerized Double–Auction Markets: Some Initial Experimental Results," *Journal of Business*, vol. 53, No. 3, pp. 235–258, (1980).

Wilson, Robert, "Design of Efficient Trading Procedures," an Article in *The Double Auction Market*, pp. 125–152, 1993.

Williams, Monci Jo., "Why the Big Players Want a Piece of Instinet," Fortune, p. 129, Aug. 19, 1985.

Wren, Worth, "Cattle Auctions Step into the Electronic Age," The Fort Worth Star–Telegram, p. 4, Jan. 28, 1991.

Wunsch, Steven, "The Single–Price Auction," pp. 279–290, *The Complete Guide to Securities Transactions*, ed. by Wayne Wagner, 1989.

Wunsch, Steven, Time to Change Open Outcry Method, (3 pages).

Wurman, Peter R., et al., "A Control Architecture for Flexible Internet Auction Servers," University of Michigan, pp. 1–12, Feb. 6, 1999.

Wurman, Peter R., et al., "Flexible Double Auctions for Electronic Commerce: Theory and Implementation," *Decision Support Systems* vol. 24, pp. 17–21, (1998).

Zampetakis, Helene, "Computers put Fish Auctions on Much More Efficient Scale," Australian Financial Review, p. 47, Oct. 30, 1989.

"Airline Seats May Go on the Auction Block," Insight on the News, Dec. 4, 1989.

"An Electronic Auction Ahead for Airline Crisis?," The BusinessWeek Newsletter for Information Executives, Oct. 27, 1989.

"Arizona Stock Exchange Opportunity Knocks," The Arizona Republic, p. A14, Nov. 22, 1991.

"Arizona Stock Exchange: Skeptics are Forgiven," The Phoenix Gazette, p. B4, Apr. 1, 1996.

"At this Auction, you Can Bid by Computer," Business Week—p. 90, Jan. 19, 1987.

"At Dead Line: AZX Alliance, Arizona Stock Exchange Discusses Possible Alliances with 6 Registered Broker–Dealer Groups, All Affiliated with an Electronic Communications Network or Operate as an ECN," Traders Magazine, Mar. 1, 1999.

"At Dead Line: Listed on AZX, Arizona Stock Exchange applies to trade listed stocks," Traders Magazine, Mar. 1, 1999.

"Attention Business Editors: Bank of Montreal Endorses Secure Credit Card Transactions on–line," Canada Newswire, Apr. 18, 1996.

*Aucnet Inc., Car Auctions by Satellite*, Asian Business, Nov. 1994, p. 16.

"Auction Block for Va. Lambs is a Computer," The Washington Post, p. v13, Mar. 23, 1989.

"Auctioning Unsold Airline Tickets," available at www.globalideasbank.org, printed on Sep. 28, 1999.

"Auctionnet Grows Rapidly in its First Year," *Crain Communications, Inc.*, Sep. 23, 1991.

"AT&T Develop 'paperless' Computerized Auction System for National Car Auctions," *M2 Presswire*, Mar. 13, 1997.

"Automated Auctions—4 –: GAO Questions Benefits of System," *Dow Jones News Service—Ticker*, Apr. 28, 1993.

"Banks Battle Credit Card Hackers," Canadian Press Newswire, May 31, 1996.

"Barbarians at the gate: Electronic Trading Systems are Proliferating South of the Border. Should Canadian Regulators open the door?," Canadian Investment Review, pp. 18–21, Sep. 1994.

"Beatrice Feeder–Pig Sales Beamed Up to Satellite," The Omaha World–Herald, p. 11, Aug. 29, 1994.

"Bid.Com's Overview," available from www.bid.com, printed Dec. 8, 1999.

"Black–box Global Trading a Challenge to Regulatros," American Banker, vol. 157, No. 120, p. 5(1), Jun. 23, 1992.

"Bond Auction By Computer, Satisfied Major Traders," The Wall Street Journal, Jul. 18, 1990, p. C5.

"BOOKIT—Travel at At the Right Price," Airline Ticket Purchase Order for Business and Leisure Travel, 1991.

"Bookit Airfare Bidding System (Fax for your Plane Ticket?)," Consumer Reports Travel Letter, vol. 7, No. 9, pp. 97, 106, Sep. 1991.

"Brief Transmission—Bank Comes Internet Credit Card Aware," TeleomWorldWire, Apr. 29, 1996.

"Building a Better Stock Market Using Call Auctions," Securities Industry News, Mar. 20, 2000 (9 pages).

"Buyside Sees Need to Upgrade Crossing Nets," Wall Street Letter, $60^{th}$ Annual Security Traders Assn. Convention: vol. XXV No. 43; p. 5, Nov. 1, 1993.

Canada's Internet Liquidators International Inc., Expands Online Auction with opening of U.S. Subsidiary In Tampa, Canada NewsWire, Jun. 26, 1996.

"Cathay Pacific Online Ticket Bidding," World Internet News Digest, May 8, 1996.

"Cathay Pacific Airways Auctions A Boeing 747–400 Worth of Seats In Third Cybertraveler Auction; Bid Now, Fly Later" In Online Ticket Auction, Business Wire, Apr. 29, 1996.

"Cattlemen Tune In to Video Auctions," The Omaha World–Herlad, p. 16b, Jun. 16, 1990.

"Changing Relationships," Chartered Banker, vol. 3, No. 10, pp. 14–18, Oct. 1997.

Computers & Automation Going, Going . . . Technology Is Making Antiques of Public Auctions Kathleen Doler, The Rythmic Palaver of the Auctioneer. The Wink and Nod of the Skillful Bidder. For Good or III, These Scenes from the Public Real Estate Auction are Quicklky Becoming Charming Relics of the Past., *Investor's Business Daily*, May 4, 1994.

"Computer Takes on Role of Auctioneer at Livestock Market," The Toronto Star, p. F7, Feb. 15, 1987.

"Computer Bidding At Auction Termed A Success: Upgrade Seen," *Dow Jones News Service*, Apr. 30, 1993.

*The Complete Guide to Securities Transactions, Enhancing Investment Performance and Controlling Costs*, ed. Wayne H. Wagner, pp. 27–30, 45–61, 63–77, 79–108, 161–169, 211–222, 279–290, and 359–372, 1989.

"The Computer Museum Brings Auction Block to Cyberspace in First Internet Auction," *Business Wire, Inc.*, Mar. 14, 1994.

"Dallas Gold & Silver Exchange, Inc. Announces Substantial Expansion of Internet–Acitivities with Launch of Precious Metals Subscription Service," PR Newswire Association, Inc., Mar. 27, 1996.

"Debis Financial Services: Debis prepares to put UK auctions on–line," MS Presswire, Mar. 8, 1996.

"Delphi Moves HQ to New York, adds 750 jobs," Post–Newsweek Business Information, Inc. May 4, 1995.

"Do Satellites Dream of Electric Sheep?," Precision Marketing, p. 12, Jul. 10, 1995.

Econometrica–Journal of the Econometric Society, vol. 50, No. 5, pp. 1089–1122, Sep. 1982.

"Electronic Market, The chance to haggle by computer," Ciencia 1990 (2 pages).

"Executive Update How Auction Technology Sped and Enhanced Sale of Radio Licenses Ted Bunker Countless Budding Capitalists Cut Their Teeth Bargaining for Monopoly Properties or Betting Nickles and Dimes in After–School Stud Poker Games," Investor's Business Daily, p. A3, Feb. 24, 1995.

"FCC Opens High–Tech Wireless Services Auction 10 Nationwide Licenses Offered; Bids Could Well Hit $50 Million," The Star–Ledger, Jul. 26, 1994.

"Firm goes Online with Auction," The Toronto Star, p. B2, Apr. 21, 1996.

"First–Ever Internet Auction Products Results for the Computer Museum," *Business Wire, Inc.*, Apr. 28, 1994.

"First Wine Auctioned Live In Cyperspace; Simultaneous Live And Cyber Wine Auction Benefits Charity," *Business Wire*, May 22, 1996.

"Fish Auctions Join Forces in Europe," Seaford International, Feb. 1, 1996, p. 8.

"Flowers are Staple of Dutch Auction,", The Phoenix Gazette, p. E3, Aug. 17, 1990.

"Flowers shipped "around the clock" through Holland's Famous High–Tech Auction," Business Wire, Aug. 9, 1990.

Golden Age Antiques and Collectibles Online Auction, available at http://www.goldnage.com, printed on Nov. 10, 1997.

"The Heyday of the Auction, Finance and Economics," Economist, Jul. 24, 1999, available at www.economist.com, (6 pages).

"High Tech in the Cattle Market," The Omaha World–Herald, Feb. 11, 1985.

"IBM 's Institute for Advanced Commerce Cyber Auctions Project Fact Sheet," IBM Institute for Advanced Commerce, Schedule of Events, Dec. 26, 1999.

Illiquid Securities Auction Organizers See Wide Participation in Taday's Kickoff, Institutional Investor, Inc., Bondweek, vol. X, No. 28, p. 8, Jul. 16, 1990.

"Individual Announces Revolutionary "Dutch Auction" System for Ads on NewsPage Web Service," Business Wire, Jul. 24, 1995.

"Instinet Corp. Accepts Offer from Reuters After it is Sweetened," Wall Street Journal, Nov. 11, 1986.

"INSTINET: Pushbutton Stock Trading Comes of Age," Information Week, p. 20–24, Nov. 2, 1987.

"The International Broker Rises," Banking World.

"ITG Links up with AZX Bridge," Wall Street Letter, vol. XXV, No. 39, p. 7, Sep. 27, 1993.

"Japan firm, Aucnet, to Supply GM Computer System to Auction Cars," *Japan Economic Journal*, p. 15, Jul. 19, 1986.

"KIIS & Unite III takes it to the Next Level with the World Wide Web Auction and a Special Appearance by Madonna," *Business Wire*, Jun. 27, 1995.

"Let's Do Wunsch; Electronic European Exchange in the Works," Wall Street Letter, p. 1, Jul. 13, 1992.

"Major Wall Street Firms Form New Electronic Trading Network," PR Newswire, Jun. 15, 1993.

*Market Making and the Changing Structure of the Securities Industry*, eds. Yakov Amihud et al., pp. 217–303, 1985.

"Mobile Phone Licenses on Sale Today High–Stakes Auction will use Computers to Determine Players for next Generation," Rocky Mountain Press, p. 39A, Dec. 5, 1994.

"New Wave of Communications Attracts High Bidding at Auction," The Fort Worth Star–Telegram, p. 2, Jul. 26, 1994.

"NYSAC says New Rule Will Make Its Auction more Flexible," Institutional Investor, Inc.,—Wall Street Letter, vol. XXI, No. 32, p. 8, Aug. 13, 1990.

"Online Commerce gets a Boost from Big Banks," Canadian Business and Current Affairs Marketing Magazine, vol. 101, No. 19, May 13, 1996, p. 4.

"ONSALE Brings Thrill of Auctions and bargain Hunting Online; Unique Internet Retail Service Debuts with Week–Long Charity Auction for The Computer Museum in Boston," Business Wire, May 22, 1995.

"Open All Hours: Future Exchanges," The Economist, vol. 329, No. 7836, p. 107(1), Nov. 6, 1993.

*Oxford Study Examines Economics of Price and Quote Dissemination*, Securities Week, vol. 22, No. 23, p. 8, (Jun. 5, 1995).

The Over–The–Counter Market, The Equity Markets Today, pp. 47–63 and 78–97.

"Playing by National Rules," Global Securities.

"Preview Media and America Online Announce New Travel Service for America Online Subscribers," PR Newswire, Feb. 7, 1995.

"Private Flower Auction Opens in Netherlands," Agra Europe, Apr. 13, 1995.

"SEC Approves AZX's Request to Operate Morning Auction," Securities Week, Vol. 23, No. 23, p. 1, Jun. 10, 1996.

"Slow but Steady Growth," Banking World.

"Some Dealers Shunned Electron Bidding At Year–Bill Sale," *Dow Jones News Service–Ticker*, Apr. 29, 1993.

"Superior Livestock Auction Unveils the Future of Marketing During Cattlemen's Meeting in Phoenix," Business Wire, Jan. 27, 1993.

"Technology Takes to Securities Trading," *IEEE Spectrum*, pp. 60–65, Feb. 1997.

"Teleres, Koll–Dove Team Up to Provide On–Line Auction Services," *Institutional Investor, Inc.,Real Estate Finance & Investment*, In the News, vol. I, No. 44, p. 2, Nov. 13, 1995.

"Too Many Trading Places," *The Economist*, pp. 21–23, Jun. 19, 1993.

"Trading Systems, Stock Exchanges and Private firms provide the Information Vital to International Trading," Banking World, pp. 51–52, Mar. 1988.

"Treasury–Auction System –3–: GAO Report Chided Treasury, Fed., " *Dow Jones News Service—Ticker*, Jul. 8, 1993.

"Unusual Farmland Auction Set," 1995 IEEE Symposium on Security and Privacy, Oakland, California (May 8–10, 1995).

"Utopia Hosts First Live Auction on the Internet: Lavish 7,000 sq. ft. Mansion to be Subject of Historical Event," *Business Wire, Inc.*, Apr. 23, 1996.

"Video Auction Puts Hawaii Sites on Block," *The San Diego Union–Tribune*, p. F–54, Jul. 21, 1985.

"Welcome to the Iowa Electronic Markets!," Iowa Electronic Markets, available at www.biz.uiowa.edu/iem, printed on Jan., 23, 2000, (22 pages).

"West Coast Agents Remain Skeptical About New Air Ticket Sales Plan; Marketel: Airline Ticket Sales System Sparks Concern," Travel Agent Magazine, p. 50, Sep. 9, 1991.

"Wine Auction On The Web," *Post–Newsweek Business Information, Inc.*, May 25, 1995.

"Wireless Networks: Auction Fever," The Economist, p. 79, Dec. 3, 1994.

A Historical Synopsis of Tradition Financial Services, available at http://www.tfsenergy.com/company.html.

Article, "Knight–Ridder Newspapers' . . . ," PR Newswire, Oct. 1, 1985.

Article, "Some Rare Bargains . . . ," PR Newswire, Mar. 20, 1984.

Liberty Brokerage Investment Corp., et al., v. Cantor Fitzgerald, L.P., et al., C.A. No. 99–522 RRM Complaint for Declaratory Relief.

Liberty Brokerage Investment Corp., et a., v. Cantor Fitzgerald, L.P., et al., C.A. No. 99–522 RRM Amended Complaint for Declaratory Relief.

Liberty Brokearage Investment Corp., et al., v. Cantor Fitzgerald, L.P., et al., C.A. No. 99–522 RRM Stipulated Order of Dismissal.

eSpeed, Inc. et al. v. Brokertec USA, L.L.C. et al., C.A. No. 03–612 (KAJ) Answer and Counterclaim.

eSpeed, Inc. et al. v. Brokertec USA, L.L.C. et al., C.A. No. 03–612 (KAJ) Notice of Subpoena Duces Tecum.

eSpeed, Inc. et al. v. Brokertec USA, L.L.C. et al., C.A. No. 03–612 (KAJ) Supplemental Answers and Objections to Plaintiffs' First Set of Interrogatories.

eSpeed, Inc. et al. v. Brokertec USA, L.L.C. et al., C.A. No. 03–612(KAJ), Answers and Objections to Plaintiffs' Second Set of Interrogatories.

eSpeed, Inc. et al. v. Brokertec USA, L.L.C. et al., C.A. No. 03–612, Complaint for Patent Infringement.

eSpeed, Inc. et al. v. Brokertec USA, L.L.C. et al., C.A. No. 03–612, Plaintiffs' Motion for Preliminary Injunction.

eSpeed, Inc. et al. v. Brokertec USA, L.L.C. et al., C.A. No. 03–612, Plaintiffs' Opening Brief in Support of Their Motion for Preliminary Injunction.

eSpeed, Inc. et al. v. Brokertec USA, L.L.C. et al., C.A. No. 03–612, Declaration of Howard W. Lutnick in Support of Motion for Preliminary Injunction.

eSpeed, Inc. et al. v. Brokertec USA, L.L.C. et al., C.A. No. 03–612 Declaration of Joseph C. Noviello in Support of Motion for Preliminary Injunction.

eSpeed, Inc. et al. v. Brokertec USA, L.L.C. et al., C.A. No. 03–612 Plaintiffs' Motion for Expedited Discovery.

eSpeed, Inc. et al. v. Brokertec USA, L.L.C. et al., C.A. No. 03–612 Plaintiffs' First Set of Expedited Interrogatories Addressed to All Defendants.

eSpeed, Inc. et al. v. Brokertec USA, L.L.C. et al., C.A. No. 03–612 Plaintiffs' First Expedited Requests for Production of Documents and Things Addressed to All Defendants.

eSpeed, Inc. et al. v. Brokertec USA, L.L.C. et al., C.A. No. 03–612 (KAJ) Defendant Brokertec USA, L.L.C.'S First Request For Production of Documents and Things.

eSpeed, Inc. et al. v. Brokertec USA, L.L.C. et al., C.A. No. 03–612 (KAJ) Defendant Brokertec USA, L.L.C.'S First Set of Interrogatories to Plaintiffs.

eSpeed, Inc. et al. v. Brokertec USA, L.L.C. et al., C.A. No. 03–612 (KAJ) Defendant Brokertec USA, L.L.C.'S First Set of Requests for Admissions.

eSpeed, Inc. et al. v. Brokertec USA, L.L.C. et al., C.A. No. 03–612 (KAJ) Responses and Objections to Plaintiffs' First Requests for Production of Documents.

eSpeed, Inc. et al. v. Brokertec USA, L.L.C. et al., C.A. No. 03–612 (KAJ) Answers and Objections to Plaintiffs' First Set of Interrogatories.

eSpeed, Inc. et al. v. Brokertec USA, L.L.C. et al., C.A. No. 03–612 (KAJ) Plaintiffs' First Set of Requests for Admissions Directed to Defendants Brokertec USA, L.L.C.; Garban, LLC; ICAP PLC; OM AB; and OM Technology (U.S.), Inc.

eSpeed, Inc. et al. v. Brokertec USA, L.L.C. et al., C.A. No. 03–612 (KAJ) Plaintiffs' Objections and Responses to Defendant Brokertec USA, L.L.C.'S First Set of Interrogatories. eSpeed, Inc. et al. v. Brokertec USA, L.L.C. et al., C.A. No. 03–612 (KAJ) Plaintiffs' Responses and Objections to Defendant Brokertec USA, L.L.C.'S First Set of Requests for Admissions. eSpeed, Inc. et al. v. Brokertec USA, L.L.C. et al., C.A. No. 03–612 (KAJ) Supplemental Answers and Objections to Plaintiffs' Second Set of Interrogatories.

eSpeed, Inc. et al. v. Brokertec USA, L.L.C. et al., C.A. No. 03–612 (KAJ) Supplemental Responses to Plaintiffs' First Set of Request for Admissions.

Charles Schwab & Co., Inc., "Charles Schwab Street Smart", *Charles Schwab Getting Started Manual*, 1994, pp. 1–29.

Memorandum from Bob McCausland to Larry Gomes, Oct. 16, 1990, pp. 2.

Memorandum from Bob McCausland to Larry Gomes, Mar. 6, 1991, pp. 2.

Memorandum from Bob McCausland to Larry Gomes, Apr. 3, 1991, pp. 2.

Memorandum from Bob McCausland to Larry Gomes, Apr. 5, 1991, pp. 2.

Memorandum from Bob McCausland to Larry Gomes, Apr. 12, 1991, p. 1.

Memorandum from Bob McCausland to Mike Pires, Apr. 19, 1991, pp. 2.

Memorandum from Bob McCausland to Larry Gomes, Apr. 22, 1991, p. 1.

Memorandum from Bob McCausland to Mike Pires, Apr. 24, 1991, p. 1.
Memorandum from Bob McCausland to Larry Gomes, May 30, 1991, p. 1.
Memorandum from Bob McCausland to Larry Gomes, Jun. 12, 1991, p. 1.
Memorandum from Bob McCausland to Larry Gomes, Jun. 13, 1991, p. 1.
Memorandum from Bob McCausland to Larry Gomes, Jul. 15, 1991, pp. 3.
Memorandum from Bob McCausland to Larry Gomes, Jul. 18, 1991, pp. 8.
Memorandum from Bob McCausland to Larry Gomes, Feb. 5, 1992, pp. 17.
Chats Advances at Chapdelaine, Bondweek, vol. X, No. 1, Jan. 8, 1990, at 7.
Voice Recognition Option Added to Chats, Bondweek, vol. X, No. 2, Jan. 15, 1990 at 4–5.
Chapdelaine's Trading System Up and Running, Bondweek, vol. X, No. 14, Apr. 9, 1990 at 10.
EJV Says Its Trading System Will Recognize Voice Orders, Bondweek, vol. XI, No. 10, Mar. 11, 1991 at 9.
Chapdelaine Notches 38 Participants on Chats, Bondweek, vol. X, No. 26, Jul. 2, 1990 at 8.
Electronic Joint Venture Reportedly Chats with Thomson Financial, Bondweek, vol. X No. 10, Mar. 12, 1990 at 10.
EJV Fills Out Management Team, Bondweek, vol. X, No. 36, Sep. 10, 1990 at 11–12.
CBOT's Absence Noted in Automated OTC Mart, but not Greatly, Bondweek, vol. X, No. 51, Dec. 24, 1990 at 7.
EJV to go on Line in Three Months, Bondweek, vol. XI, No. 8, Feb. 25, 1991 at 2.
EJV Snares Sanction for Autotrade System, Bondweek, vol. XI, No. 16, Apr. 22, 1991 at 13.
EJV to Pilot Its First Analytics System Next Month, Bondweek, vol. XI, No. 20, May 20, 1991 at 10.
Some Bills Trading Gets Done on EJV's System, Bondweek, vol. XI, No. 22, Jun. 3, 1991 at 12.
EJV's Analytics Product is 6–9 Months from Market, Bondweek, vol. XI, No. 26, Jul. 1, 1991 at 10.
Univu Pilot is up at EJV's Partners, Plus One Non–Partner, Bondweek, vol. XI, No. 32, Aug. 12, 1991 at 8.
EJV Aims to Launch Analytics Service by Year End and Long Bond Added to EJV's Treasury Bond–Trading System, Bondweek, vol. XI, No. 38, Sep. 23, 1991 at 9.
EVJ Pre–Selling Its Analytics Product, Bondweek, vol. XI, No. 50, Dec. 16, 1991 at 11.
Trading Tech Secrets: A Chat with Dexter Senft of EJV Partners, Bondweek, vol. XII, No. 10, Mar. 9, 1992 at 8.
CBJ–EJV Deal said to Please Feds, Bondweek, vol. XII, No. 12, Mar. 23, 1992 at 7.
Bondweek, vol. XII, No. 20, May 18, 1992 at 8, (several articles).
CBOT Eyes Screen–Based Repo, Basis Trading with EJV System, Bondweek, vol. XII, No. 22, Jun. 1, 1992 at 8.
Discontent Reported Among Some EJV Backers, Bondweek, vol. XII, No. 24, Jun. 15, 1992 at 11–12.
UNIVU: EJV Begins Filling in the Dots, Bondweek, vol. XII, No. 30, Jul. 27, 1992 at 10.
Merrill Mulls EJV Participation, Bondweek, vol. XII, No. 34, Aug. 24, 1992 at 1 and 11.
CBOT Members Approve EJV Deal and First Boston to Offer Government Bond Trading System on Bloomberg, Bondweek, vol. XII, No. 38, Sep. 21, 1992 at 1, 8, and 11.
Bondweek, vol. XII, No. 40, Oct. 5, 1992 at 8, (several articles).
Three Tech Managers Leave EJV . . . As Company Retools for Univu Rollout, Bondweek, vol. XII, No. 42, Oct. 19, 1992 at 8.
Liffe Plans £1.25 Million Upgrade of its After–Hours System, Bondweek, vol. XII, No. 46, Nov. 16, 1992 at 11.
Bondweek, vol. XIII, No. 5, Feb. 8, 1993 at 8.
Liberty in Talks to Join EJV, Bondweek, vol. XIII, No. 10, Mar. 15, 1993 at 2.
Liberty, EJV Debut Joint Venture, Bondweek, vol. XIII, No. 34, Aug. 30, 1993 at 2.
Advertisement in Bondweek, vol. XV, No. 4, Jan. 30, 1995, Starting Mar. 1, The Muni Bond Futures Contract will be an Even Better Trading Tool.
EJV Develops Windows–Based Software to Access F.I. Data, Bondweek, vol. XV, No. 46, Nov. 20, 1995 at 6.
Advertisement in Bondweek, vol. XVII, No. 8, Mar. 3, 1997, CBOT Yield Curve Spreads Because a Lot Can Happen in a Short Amount of Time.
Advertisement in Bondweek, vol. XVII, No. 17, May 5, 1997, The T–Bond. And Now the Bond Open Outcry Trading in the World's Two Largest Bond Contracts at the CBOT.
Chicago Board Brokerage User Manuel, 27 pages.
Nicholas Brady, Richard Breeden, and Alan Greenspan, Joint Report on the Government Securities Market, Jan. 22, 1992.
eSpeed, Inc. et al., v. Brokertec USA L.L.C., et al., C.A. No. 03–612 (KAJ), Supplemental Opening Brief in Support of Motion by Plaintiffs eSpeed, Inc., Cantor Fitzgerald, L.P., and CFPH, L.L.C. for Preliminary Injuction.
eSpeed, Inc. et al., v. Brokertec USA L.L.C., et al., C.A. No. 03–612 (KAJ), Defendants' Proposed Findings of Fact and Conclusions of Law.
Charles Schwab & Co., Inc., "Charles Schwab Street Smart," Charles Schwab Getting Started Manual, 1994, pp. 1–29.
Levecq, Hugues, et al., "Electronic Trading Systems: Strategic Implications of Market Design Choices," Working Paper, Stern #IS–95–19, 1995, pp. 1–28.

* cited by examiner

AUTOMATED PRICE IMPROVEMENT PROTOCOL PROCESSOR

STATEMENT OF RELATED CASE

This is a continuation-in-part of U.S. patent application Ser. No. 08/766,733, filed Dec. 13, 1996, now U.S. Pat. No. 5,905,974, the disclosure of which is incorporated herein by reference.

FIELD OF THE INVENTION

The present invention relates to data processing systems for assisting in financial transactions. More particularly, the present invention relates to a data processing apparatus and method for the managed trading of select classes of assets including securities, financial instruments, commodities, and their derivatives in accordance with specific protocols in an auction format with controlled sequences of auction events. The inventive system is presented in the context of a selected fixed income financial instruments auction for fairly and quickly transacting bid-offer trading, while providing for distribution of trading incentives.

BACKGROUND OF THE INVENTION

Economic activity has at its centerpiece the buyer-seller transaction for all goods and services produced and consumed in the market economy. It is the fundamental mechanism that allocates resources to producers and output to consumers. The operation of the buyer-seller mechanism can and often is a critical determinant of economic efficiency and when operated properly, will substantially enhance market performance.

Through history, there have been many different approaches adopted to bringing buyers and sellers together, each with the key objective of permitting transactions at or as close as possible to the "market" price of the goods satisfying the desires of both buyers and sellers. By definition, the market price is the price (in given currency terms) that a fully educated market, given full access will transact select goods. Discovery of the market price can only be accomplished by permitting full access to the transaction by essentially all potential buyers and sellers and allowing expression of each party's desires. However, the buyer-seller transaction must be structured to operate at very low costs—or it will distort the market price of goods with artificially high transaction costs. Thus, the two keys to effective buyer/seller transactions—full access of expression and knowledge coupled with low transaction costs—can be and are often conflicting, necessitating trade-offs between trading efficiency and market knowledge.

One well-known and particularly successful buyer-seller transaction system is known as the "open outcry auction". This involves a process wherein buyers and sellers collect in one location and brokers present prices for select goods to the group, via simple vocal offerings. This approach has been used for almost all kinds of goods, but is particularly useful where there are no established trading locations or markets for the selected items. It is the dominant trading forum for exotic items such as rare pieces of art and the like. Although successful in bringing interested parties to the transaction, the overall process can be very expensive, adding significantly to the market-distorting transaction costs.

Open outcry auction techniques, modified over time, have also found successful application in many trading activities, including the buying and selling of farm produce and livestock, commodities contracts, futures contracts on a variety of items and—particularly germane to the preferred embodiment of the present invention—fixed income securities. Many of these trading activities focus on the buying and selling of essentially fungible items, that is, items that are without meaningful differentiation from like items on the market. For example, a bushel of wheat for February delivery is considered for sale and delivery at a price independent, of its source. Similarly, a 30-year U.S. Treasury bond paying a coupon rate of 6.75% and having an August 1996 issue date is indistinguishable from one owned by another investor. Accordingly, the price at which buyers are willing to pay and sellers are willing to accept defines the market price of all 30-year U.S. Treasury bonds of that same vintage, allowing open outcry auction trading that is transparent as to its sources.

The fixed income securities issued by the United States government are known as U.S. Treasuries. These instruments typically span maturities of 13 to 52 weeks (T-bills), one to ten years (notes), and up to 30 years (Bonds). T-Bills are pure discount securities having no coupons. Almost all other Treasuries having longer terms are coupon notes or bonds, with a defined interest payment cycle of semi-annual payments to the holder. An additional and more recent type of Treasury security provides for inflation indexed payments.

Although treasuries are used exclusively in the following discussions, the principles of the present invention may be applied to other types of assets, including securities, financial instruments, commodities, and their derivatives without departing from the inventive concepts.

New Treasury securities are auctioned by the U.S. government at pre-established auction dates. The auction prices for newly issued Treasuries having a face value with a set coupon rate defines the Treasuries' yields when issued. After the auction, the Treasuries enter the secondary market and are traded typically "over the counter," i.e., without a defined exchange. As inflation expectations and supply and demand conditions change, the prices of recently auctioned Treasuries fluctuate on the secondary market. The new prices are reflected by competing bid and offer prices communicated among institutions, banks, brokers, and dealers in the secondary market.

The newly auctioned securities are traded with and in conjunction with the securities issued in earlier auctions. In this context, some securities are traded more often than others and are called the "actives"; the actives usually correspond to the recently issued securities as opposed to the older securities in the market. Indeed, some older securities are infrequently traded, resulting in an illiquid market that may or may not reflect the market—determined interest rate for the more current securities at the same maturity length.

Accordingly, the very size and diversity of the Treasury market requires a high level of sophistication by market participants in the bidding, offering, buying, and selling transactions involving these securities. The very complexity associated with the transaction and the scale of trading undertaken by banks, brokers, dealers, and institutional participants necessitates a rigidly structured approach to trading.

In the past, open outcry auction bond brokering has served its customers well, providing efficient executions at nearly accurate market pricing. The open outcry auction applied to bond trading was implemented by a broker working with a collection of customers to create and manage a market. Typically, customer representatives—for both buyers and sellers—would congregate at a common location (e.g., a single room) and communicate with each other to develop pricing and confirm transactions. This process involved representatives expressing various bid and offer prices for the fixed income security at select volumes (i.e., how many million dollars of bonds at a given maturity). This expression took the form of the loud oral "cry" of a customer-proposed bid or offer and the coordination with the fellow representatives regarding the extraction of complimentary positions—until a transaction match was made and a deal done. This "trade capture" process relies on after-the-fact reporting of what just transpired through the oral outcry trade.

Recently, the trade capture process was performed by designated clerks inputting data into electronic input devices. An input clerk would attempt to interpret the open outcry of many individual brokers simultaneously, making verbally known the trading instructions of their customers. The quality of the data capture was a function of the interpretive skill of the input clerk, and the volume and the volatility of customer orders. A significant drawback to this type of auction data capture process is the difficulty in discerning the distinct trading instructions verbalized in rapid succession during a quickly moving market, so that an accurate sequence of data can be captured.

The many permutations of this process will be discussed in detail below. At this juncture, suffice to say that, at lower volumes of transactions existing at the time of its development, and the lack of suitable alternatives, the open outcry auction process remained the dominant trading mechanism for decades. However successful, this approach was not perfect. Indeed, in recent years, some of the problems in an open outcry auction forum have been amplified by the vastly increased level of trading now undertaken in the fixed income field. Generally, difficulties would occur by the injection of trader personalities into the open outcry auction process. For example, a loud, highly vocal representative may in fact dominate trading—and transaction flow—even though the representative may only represent a smaller and less critical collection of customers. Although such aggressive actions at open outcry auction may be beneficial to those particular customers in the short run, overall, such dominance of the trading can and will distort pricing away from the actual market and leave some buyers and sellers unsatisfied.

Other problems exist in open outcry auctions that retard efficient trading. The speed at which trading flows and the oral nature of the auction process injects a potential for human error that often translates into many millions of dollars committed to trades unrelated to customer objectives. On some occasions, the broker is left at the end of each trading day with a reconciliation process that may, under certain market conditions, wipe out all associated profit from that day's trading. Also, customers may quickly change direction regarding the trading, based on new information available to the market. Shifting position or backing out of a previously committed transaction on very short notice is often very difficult in the traditional open outcry process.

There have been many past efforts to incorporate computers into trading support for select assets and financial instruments, including automating the auction process through systems that control auction protocols. Indeed, almost all trading today involves some computer support, from simple information delivery to sophisticated trading systems that automate transactions at select criteria. However, these systems have not significantly impacted the issues presented relating to satisfying the complex desires of buyers and sellers in completing a transaction as they relate to open outcry auction and traditional trading in the fixed income field. It was with this understanding of the problems with certain trading processes involving the buyer and the seller that formed the impetus for the present invention.

OBJECTS AND SUMMARY OF THE PRESENT INVENTION

It is, therefore, an object of the present invention to provide a data processing system to implement a trading system capable of high volume trading activity.

It is another object of the present invention to provide a data processing method supporting a transaction enabling process for trading securities at accelerated levels with few errors and low costs.

It is yet another object of the present invention to provide a data processing system to support a formalized trading protocol governing the control of trading on a bid/offer market.

It is also another object of the present invention to provide a system for collecting, displaying, and distributing in real time information on current market activity in securities, and for processing this information to quantify the extent of order and trading activity of participants in real time.

It is another object of the present invention to provide an apparatus for the select processing of several types of data wherein data is qualified prior to use, and for translating the qualified data into order and trading states for fixed income securities.

It is yet another object of the present invention to provide a data processing system that provides controlled access to trading commands pursuant to pre-established interactive, rather than traditional, bidding, offering, and trading criteria.

It is yet another object of the present invention to provide a computer system that includes multiple workstations linked by high speed communication paths to permit rapid distribution and exchange of market data to participants.

It is still another object of the present invention to provide a system that by granting priorities rewards participants that create liquidity while insuring that participants' orders are satisfied in an orderly and equitable fashion.

It is another object of the present invention to encourage buyers and sellers to reveal their total buy and sell indications through the commencement of a trading action that improves price execution.

It is another object of the present invention to quantify price improvement of trading incentives of buyers and sellers and bidders and offerors.

It is yet another object of the present invention to distribute price improvement trading incentives to buyers and sellers.

It is still another object of the present invention to allocate trades in uniform trading increments among buyers and sellers.

It is yet another object of the present invention to provide a database system linked to a price improvement protocol processor for collecting, filtering, and distributing select market data in real time.

It is another object of the present invention to provide a computer system with a dedicated input system for a workstation, that is customized for the trading undertaken at that workstation and may be customized to the trading patterns of a given participant at that workstation.

It is still another object of this invention to provide customized trading tools particular to a given participant, such as price improvement orders, stop and limit orders, contingent orders, and flags warning such that a particular participant has reached a trading limit, margin limit, trade initiation limit, and the like.

The above and other objects of the invention are provided by a computer-based, data processing system having program controlled logic for managing select trading. The data processing system employs a plurality of trading workstations linked with a server for coordinated data flow and processing. Communication is provided by a network, such as, for example, an Ethernet, token ring, token bus, or other hierarchical LAN and/or WAN configuration. The system preferably includes a dedicated keypad for input at each workstation that provides individually programmed keystroke commands; alternatively other keyboards, keypads or voice controlled electronic devices can be used with the present system. Central processing logic dictates the available order, trading and allocation options, and screen displays for each workstation. As orders and transactions are entered, various protocols affect the allocation of bid-offer control, priority generation, exclusive trading time, and interactive trade management. As trades are completed, the system updates a linked database with newly entered transactional data.

In accordance with the present invention, the controlling logic provides a sequence of trading states for each participant. The five states are:

1. Bid-Offer State
2. When State
3. Workup State
4. Second Look State
5. Workdown State As various transactions are entered, workstations operate in one of these five states. The workstation "state" determines the options available to that participant—and thus controls the flow of orders and trades in a cost-efficient and error-free manner. While participants may bid offer, and trade on differently configured workstations, the protocols are universal for all participants, thereby precluding aggressive control of transactions without true capital commitment.

The foregoing features of the present invention may be more fully appreciated by review of specific illustrative examples thereof, presented herein below in conjunction with a descriptive set of figures.

DETAILED DESCRIPTION OF THE INVENTION

Figure 1:
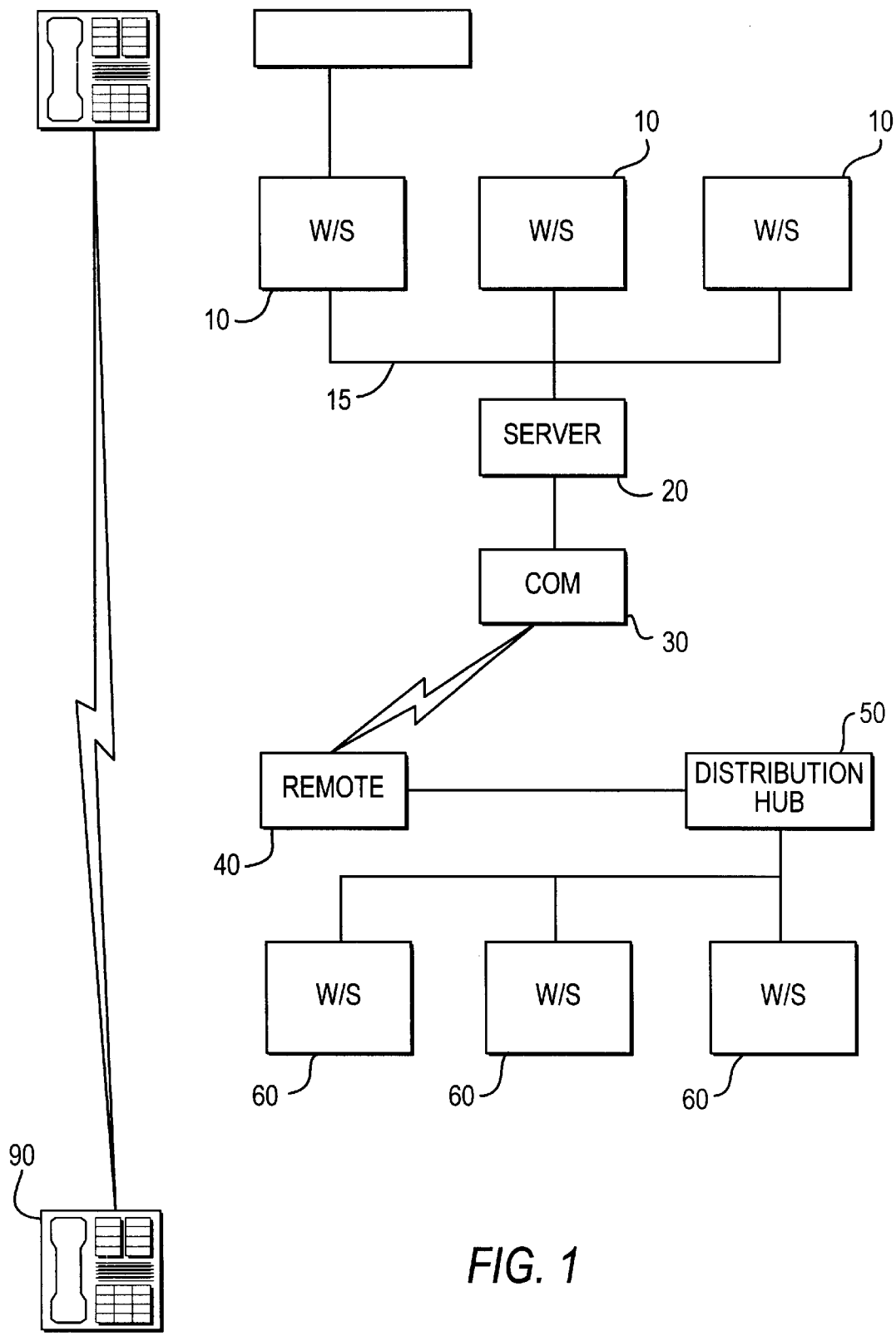
FIG. 1 is a system block diagram depicting the salient hardware components of the present invention.

The present invention is directed to a data processing system for implementing complex trading rules in support of select transactions. The first aspect of the invention relates to a particular hardware arrangement that provides a specifically tailored platform for processor enhanced and supported trading. This hardware arrangement encompasses a plurality of custom designed workstations linked together for communication. Each workstation communicates to a central server that orchestrates the trading process in accordance with program controlled logic. The workstation includes a display for presenting the particulars of trading activity. Preferably a customized keypad permits enhanced data/trade entry by a participant or a participant selected input interface.

The second aspect of the invention is the governing logic for controlling system dynamics. This logic is stored in system memory and provides the sequence of protocols and rules that allocate trading priority. The logic also provides system responses to operative commands entered by the participants, either directly or through brokers or terminal operators, at the workstations. The system logic is important in two ways. First, it is important as the guiding principles underlying the system and thus performance is tied directly thereto. Second, system logic must be known to all participants as the rules dictating market access and response—to eliminate any confusion and to place participants on as close to an equal footing as possible. The the system preferably provides fair and complete access to the trading process to all registered participants.

To better appreciate the following details, the nomenclature is defined below. The illustrative examples herein, but not limited to them, all focus on fixed income instruments and the trading of these instruments in large volumes—with the volume of a given transaction delineated in, but not limited to, dollars (e.g., $25 million of 10 year treasuries).

The following terms are used with the associated definition:

| | |
|---|---|
| Bid | Dollar or yield amount bid to buy a security - Issue |
| Offer | Dollar or yield amount offered to sell a security - Issue |
| Spread | Difference between best Bid(s) and best Offer(s) on market |
| Issue | A common class of fixed income securities, e.g., the most recently issued 10-year Treasuries. |
| Participant | A person or controlling entity receiving data on trading and responding thereto. While the Participant is often a trader, terminal operator, or broker acting on behalf of a customer, this is not the only arrangement. For example, the customers may interact as Participants directly. Other arrangements are also possible. |
| Hit | Accepting a pending Bid |
| Take or Lift | Accepting a pending Offer |
| Size | The volume in dollars of a particular Bid-Offer |
| Makers | Participants with pending Bids and Offers - making a market |
| Uncleared Entry | Current Bids-Offers that only a Maker can hit or take |

-continued

| | |
|---|---|
| Traders | After a trade is initiated, all Participants involved in the transaction (as buyer or seller) |
| Exclusive Time | A time period commenced by a trading action during which the first best bidder/offerer has the opportunity to trade more |
| Price Improvement Hit | An accepted sell order at and/or below the current best Bid to sell a security - issue initially for more volume than shown on the Passive Side |
| Price Improvement Take | An accepted buy order at and/or above the current best Offer to buy a security - issue initially for more volume than shown on the Passive Side |
| Trade | A string of transactions at one or more prices initiated by a Hit or Take and continuing until timed out or done |
| Aggressor | A Participant who initiates a trade |
| Active Side | Group of traders on the same side of market as the Aggressor |
| Passive Side | Group of traders on opposite side of the market from the Aggressor |
| Trader Surplus | Describes and quantifies the situation where an Aggressor has traded the entire size shown on the Passive Side at one or more price levels and is showing intent to trade more or where a passive Participant is willing to buy or sell above or below the current trading price. These situations lead the way to a Price Improvement trade between Aggressor(s) and passive Participants. |

The general context of system operation is based on the repetitive operation of several functions and, in its original embodiment, implements these functions through a specially designed keypad or other input means. Generally, the process begins when Participants place Bids and Offers for a defined class of instruments. These various orders are exhibited on the display screen in specific ways to reflect priority, size, and kind. A Participant can establish trading priority by placing a Bid or Offer at a select price and volume; bids at the same price are displayed on the screen in time order in which they enter the system (as are Offers). As such a "queue" of Bids and Offers develops, with place in line set by time at the same price. Alternatively, the queue can be set by a different metric ranking, e.g., a combination of time and size. This queue (or a summary thereof) is displayed on screen at the Participant's workstation. Typically, there is a small difference between the Bid price and the Offer price— the "Spread". If no difference exists, this is known as a "locked" market.

Importantly, a Bid and Offer are commitments—once placed, a Bid can be "Hit" and an Offer can be "taken or lifted" by a Participant willing to trade the instrument at the set price or set of prices.

To control trading between many Participants, a level of hierarchy is set. A Participant who Hits a Bid or Lifts an Offer is promoted to a new level known as the "Aggressor". By acting on a Bid or Offer, the Aggressor defines (and thus establishes) the Active Side of the trade. For example, if the Participant hits a Bid, selling becomes the Active Side of the trade and buying turns passive. However, if the Participant takes an Offer, buying is active. This is an important practical consideration, as by some conventions the Active Side pays commissions on the ensuing transactions. When a Price Improvement trade takes place, however, the commission on this trade can be divided among the Participants in the trade. This allocation of commissions is premised on the notion that the active Participants are taking advantage of liquidity—while the Passive Side is supplying liquidity to the market, and on the notion that if a better price can be obtained during Price Improvement trading, a passive trader is provided with value for which he/she is willing to pay. Further combinations of commission allocation are warranted to encourage trading, e.g., choices among volume discounts, annual fixed fees, both sides pay, and paying based on time and place of execution.

For controlled implementation, the above-noted delineation between Active and Passive Sides is important and carries more significance in processing transactions than the different sides of the transaction, i.e., the Bid and Offer.

Focusing further on the nomenclature for the system logic, a "Trade" is considered a sequence of trading events, triggered by the initial Hit or Take that defines the Aggressor, and continues for all such transactions until the trade "clears". During a non-price improvement trade, the Aggressor side remains active and all transactions take place at the price set by the initial Hit or Take—regardless of the number of following transactions. To properly track activity, a trade generates a (virtual and/or real) single trade ticket—with associated and screen-displayed reference number. Where a transaction reflects more than a single buy/sell, several trade tickets each reflecting the total size transacted per Participant, per side is recorded. A set of average price tickets or their equivalent may be generated.

In addition, the system controls the Participant's maximum command size thereby preventing a Participant from committing order transmittals that are outside the Participants' permissible trading parameters. This control logic also protects the novice Participant. Through this process, Participants with different skills can trade on a more level playing field. The processor can also control the hierarchy of Participants to allow management intervention.

FIG. 1 depicts the various hardware components found in an operative embodiment of the present invention. In this context, a plurality of workstations 10 are provided, each individually linked to a central server 20 via network lines 15. Server 20 includes controlling software for managing the interaction of the dataflows to the individual workstations 10 in accordance with system constraints.

Continuing with FIG. 1, the system may be linked to Participants at remote locations directly, indirectly, and/or through the Internet. Access to trading activity is accomplished at communication server 30 and remote server 40 to a remote distribution hub 50 and remote workstation 60. Supplemental communication lines are utilized via conventional phone link 90. The above platform further includes a 32-bit operating system to manage the multi-tasking environment within the network. The present invention has been successfully implemented using an open VMS64-bit operating system running on DEC Alpha clustered servers; however, other operating systems may be substituted. Alternatively, the desktop client machines can be implemented in OS/2®; Windows N/T 4.0 is a migration substitute. The workstation provides display and input and can be selected from Pentium® processor based PCs, SPARC Station® (using UNIX®), or other hardware and software systems and/or languages providing the requisite functionality.

Figure 2:
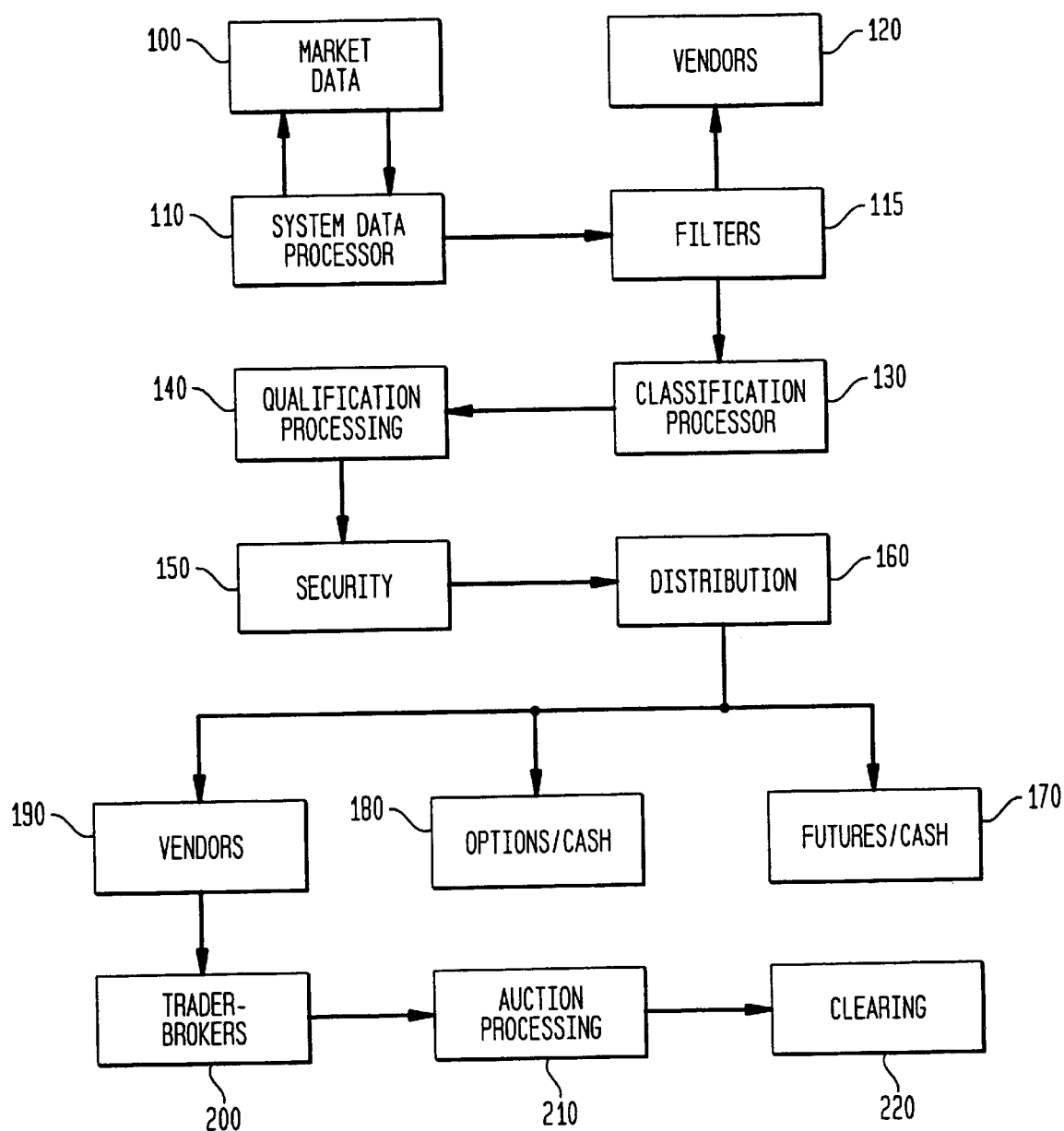
FIG. 2 provides a flow diagram depicting the transmission of trading related information.

Now turning to FIG. 2, the overall information paths of the present invention are presented in block diagram form. This market information is derived from the auction process and is a highly valuable source of data to related markets, futures and options, or cash as the case may be. Beginning with block 100, market data is collected from the plurality of on-line terminals operated by Participants within the relevant market sector. A continual exchange of information flows among the Participants, depicted in block 100, i.e., as Bids, Offers, and trades are transacted in real time. This information is collected by the system proprietor and entered into the data processor database.

On-line market data is then transferred to the data filter and enhancer module, block 115, which acts to clarify and articulate the continuous incoming market data for use, e.g., by data accumulators, block 120. One aspect of the data enhancer operation will be the conversion of on-line trading information into digital form for transmission to the classification processor, block 130. The operation of the classification processor is directed to creating a data set in proper format for further manipulation. This includes the generation of a coordination array of data in matrix format.

Once properly formatted, the on-line market data is then transmitted to the qualification processor, block 140, for determination of a real time command selection. The qualification processor also provides both Participants' validation and credit limit approval with Participant and security type linkages among Participant relationships and security identifiers. The information is then unloaded into the security database, block 150, and then passed to the distribution processor, block 160.

The foregoing operation will result in the real time distribution among Participant workstations for decision execution and for select distribution within the fixed income investment community, through communication lines and screen displays. In the context of the present invention, three segments of this community are provided with the data. At block 180 and block 170, system proprietors involved in automated options and futures processing are provided the cash market data for quantifying and evaluating specific options and futures positions pursuant to the trading of option and futures contracts on specifically identified securities, including indices and notional securities derived therefrom. In a similar manner, the securities data is provided to system proprietors regarding options and futures contracts to permit proper transactions in the trading of options and futures contracts based on the identified securities data.

In the present context, the data relating to the auctioning of cash market securities is used to support trading in their derivative markets. Likewise, if the context were the auctioning of derivative securities, distribution flow would be to support trading in the underlying security.

The third channel of distribution for the Securities is to the data accumulators and vendors at block 190. This is followed by the continual distribution of the securities data to Participants within the investment and trading community, block 200, the support of automated trading, block 210, and finally, declaring and reporting functions associated with such trading, block 220, to include clearance operators among others.

The trading activity is highly fluid and fast paced. Accordingly, efficient input systems are helpful to effectuate the multiple trading choices which may be enhanced by use of a highly specialized keypad that permits higher trading efficiency in the present context. Accordingly, a separate aspect of the present invention is the unique keypad depicted in FIGS. 3A–B.

During processing, various "states" are reached, depending on the type of inputs received by the system. The core state of Bid-Offer reflects the open status of the market. In this state, Participants are referred to as "Makers" and "contra-makers"; during other states, Participants are considered "Traders" and "contra-traders". Under this notation, Traders and Makers are those Participants that issue a trading command, while contra-makers and contra-traders are those who receive a trading command. Some Participants e.g., first buyer and/or first seller, in the Workup State are known as "current workers" and are vested with the authority under system logic to control a trade for a predetermined duration of time. Depending on the fixed income security or instrument, this duration of time may be zero. Important character distinctions among Participants at various stages of trade processing are displayed on screen by reverse highlight or similar display attributes.

Figure 4:
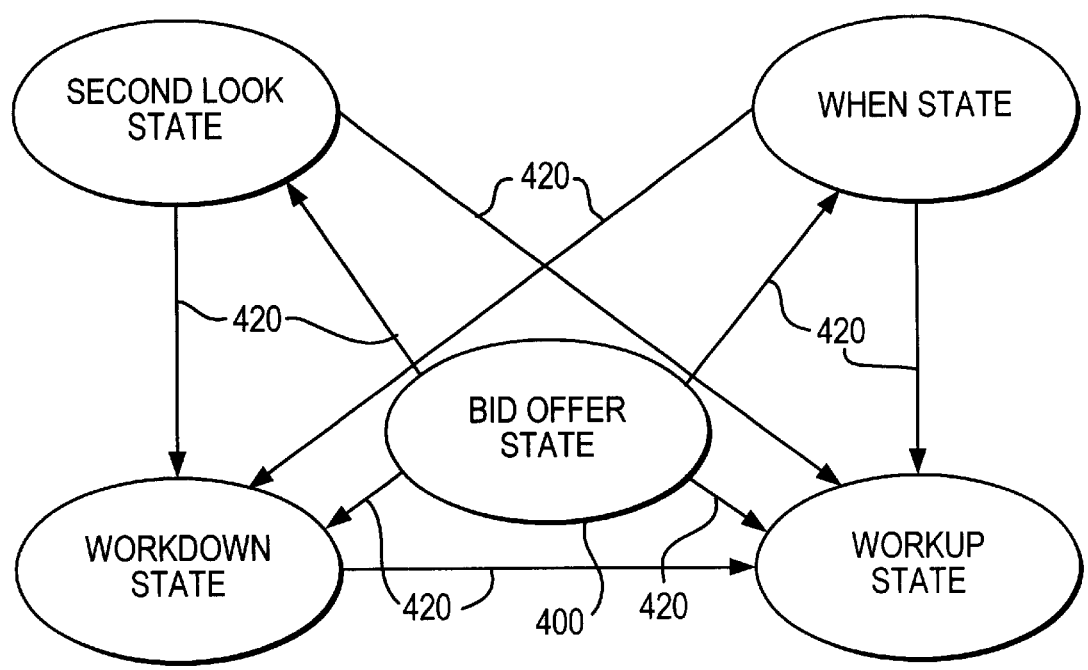
FIG. 4 is a block diagram of the various system states and pathways therebetween.

The interrelationship of these five system "states" is depicted in FIG. 4. Initial trading is always predicated on the Bid-Offer State, 400, with the sequence process, 420, assessing system inputs for a change of current state. As inputs are entered, a state change is triggered and processing shifts to paradigms associated with each of the five states. As each state is entered, the protocols are shifted and new rules to trading apply.

Information about trading progress and Participants are provided at each workstation in the form of a selectively configured screen display. In particular, the system provides for screen display in the form of a trading quadrant or "quad" wherein key trading indicators are displayed. A sample QUAD is depicted below:

| QUAD 1 | | | | | |
|---|---|---|---|---|---|
| 100.01 | | 2 | 100.03 | | 15 |
| Cust | Bid | Bot | CUST | Offer | Sold |
| 2001 | 1 | 0 | 2007 | 5 | 0 |
| 2002 | 1 | 0 | 2006 | 10 | 0 |
| TOTAL | 2 | 0 | | 15 | 0 |

In the above QUAD, the current bid price is "100.01" (100 plus $\frac{1}{32}^{nd}$); continuing across on the same line, the current Offer price is set at "100.03"—indicating a Spread of 0.02 ($\frac{2}{32}^{nds}$). When a trade is in progress—as initiated by a Hit or Take from the Bid-Offer State, the Participant's attention is mainly directed to the conditional prompt showing the total size that is being bid or offered and that can be acted upon by the Participants. This number is displayed at the intersection of the Totals line and one of the Bid-Offer columns. This total is further defined in the quad into individual prequantities, indicating the Participant sizes in their respective rows. Other QUADS or arrangements can be under Participant or logic control to display trading state information.

Above the BOT and SOLD captions in QUAD 1, a second totals counter provides the Makers total size. In the Bid-Offer State, this total is the same as the conditional prompt because no trades have been executed. This changes after the first transaction when a "Traders list" is created—and the conditional prompt tracks the traders total, while the Maker's total keeps track of quantity left in the Maker's list.

Figure 5:
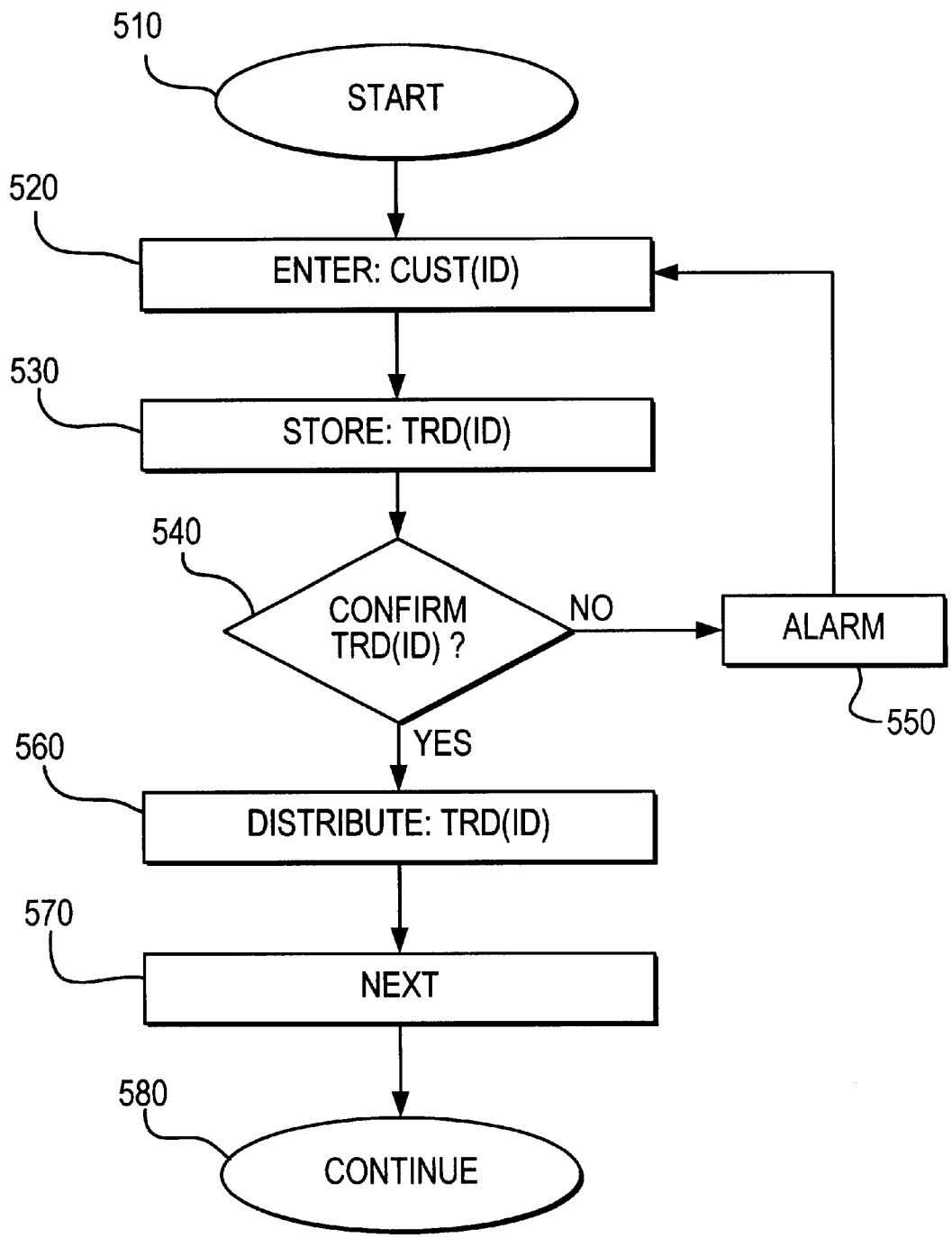
FIG. 5 is a logic diagram for trading data input.

Turning now to FIG. 5, the data selected for display on the Quad is processed in accordance with the depicted logic. The system enters a new Participant, CUST(ID), block 520, e.g., "2001" and stores this in active memory with associated trade data/command TRD(ID), block 530. The trading command is confirmed at a systems level, i.e., rejecting system errors via Alarm, at 550. Once confirmed, the new data/command TRD(ID) is distributed to the screen buffers for the associated work status for display, block 560. This is repeated for each new entry, block 570.

The following discussion now focuses on the Bid-Offer State, wherein market Makers are inputting various Bids and Offers into the system while waiting for an execution as the market matures. The best first Bidders and Offerers receive trading priorities during clearing and Exclusive Time. These pending commitments may be acted upon via Hit or Take commands by Makers currently showing or by a third party without showing its position prior to the Hit (or Take). As new Bids and Offers are made, the price attendant therewith determines the placement in the queue, with equally priced Offers (or Bids) placed in time order. Accordingly, as the market tightens with better Bids and Offers (reducing the Spread), these new positions are moved to the top of the queue as displayed.

In addition to price, Bids, and Offers, a size component is included, that is used to express the dollar volume of the pending Bid (or Offer). For a Participant to increase the size of the Bid or Offer, a new entry is made, and placed into the queue separately as the system will not increment the size component—unless the entry was made adjacent in time to an existing Bid-Offer already in the queue. Alternatively the sizes could be combined in this way: as Bids and Offers are entered during this state, they are displayed in relation to their respective size, with the total Bid-Offer count (aggregate size) displayed at the noted conditional prompt. As such, the conditional prompt serves as the main impetus for a transaction due to its measure of apparent market capacity at a given price.

A Bid-Offer is typically (but not always) entered as "uncleared" during the Bid-Offer State—indicating that the Bid or Offer is only available to the first-best market Participant, i.e., on the top of the first queue. Accordingly, uncleared presentations are available for action by only this Participant for a system set time interval—and only this Participant can Hit or Take these uncleared entries. After the preset time interval has run (tracked by a system internal clock), the uncleared bids/offers—if still extant—become available beyond the current Makers. In fact, for certain securities, the preset time interval may be zero. Most often, a known interval is established. There is a business purpose for this arrangement. By allowing Participants are rewarded with active Bid-Offers the first chance for the new entry, these Participants for showing the market on their side. Thus, the initial bidders/offerors are invited to become Aggressors—and the system preset interval provides these bidders/offerors time to make their decision by preventing new buyers and sellers from entering into the trade (i.e., hitting or taking) for this discrete interval.

Figure 6:
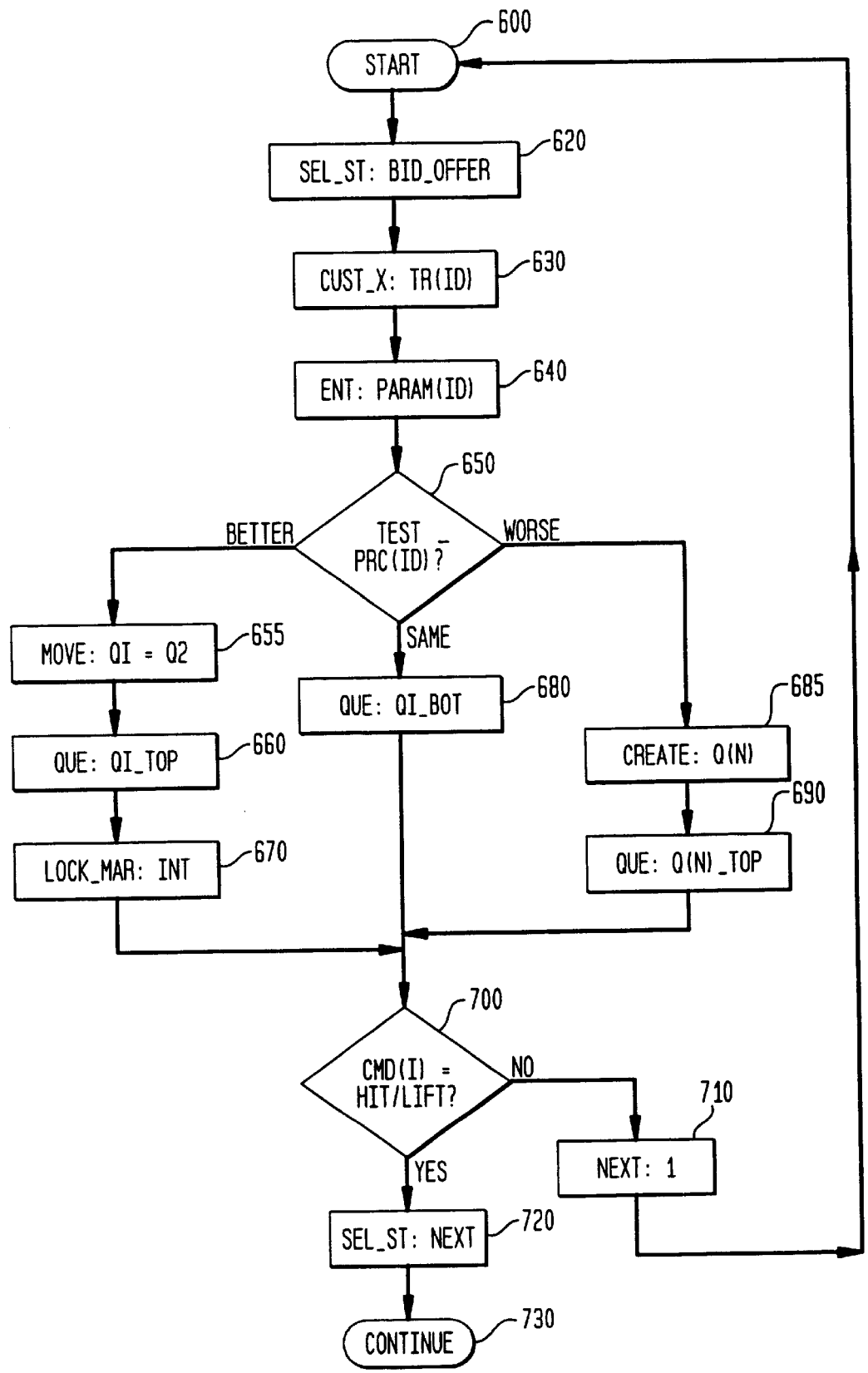
FIG. 6 is a logic diagram for Bid-Offer State.

The system logic associated with the Bid-Offer State is depicted in FIG. 6. Logic conceptually begins at block 600, with the data/command entry block at 620. The State Selector qualifies the State as Bid-Offer, block 620. At block 630, the CUST_X profile is taken from the new entry and all associated data passed into a parameter string, block 640, which is entered.

Continuing on this logic path, the system compares the new Price entry, PRC(I) entered into the system at Test 650, with pending Bids (or Offers—if PRC(I) is associated with an Offer). Test 650 results with one of three choices: if the new entry PRC(I) is better than the current market, logic branches to block 655 and the previous top tier queue, Q1 is demoted (moved) to Q2. The new entry then forms the first line in the new top queue, Q1_TOP at block 660. In this way, the system creates multiple queues at select price points for each side of the market. The multi-queue environment permits "Price Improvement" trading as will be detailed below.

Continuing in FIG. 6, if the new entry is out of the market, i.e., "worse" than the best current Bid-Offer, logic branches to block 685 and a new queue, Q(N) is created. In this instance, the new queue, having a price point worse than the market leaders, is displayed below the top queue. At block 690, the new entry is placed at the top of the new queue, Q(N)_TOP.

As more entries are inputted, the system assesses each and places them in the multiple queues in accordance with price; and within each queue in accordance with time priority. This results in several price defined queues for each side of the market and allows for Price Improvement trading if and when a new Aggressor takes/hits all showing volume for one and up to all shown contra-queues.

In FIG. 6, the final outcome from Test 650 is a qualified price, which leads to block 680. This entry is placed at the bottom of Q1 because of time priority.

At test 700, system checks for a new Hit/Take; if none, logic continues to the next entry, block 710. A positive response to Test 700 shifts processing to the next state, block 720.

The screen display will change according to the various entries into the bidding process. In QUAD2 depicted below, Participants 3001–3003 on the bid side reflect a market of 27 million, see conditional prompt "27" on the totals line. This includes a first bid by Participant, CUST 3001 of 5.0 million, followed a little later by a second bid of 20 million. In this example, Participant, CUST 3007 (e.g., a bank or other institutional Participant) has entered the picture with an uncleared Offer of 10 million (asterisk indicates the Offer is uncleared); this is the 10 million depicted on the conditional prompt line on the Offer side. As such, controlling logic gives the original Makers the first chance for the new Offer by 3007. After the interval, the market is again opened and the asterisk is removed.

| QUAD 2 | | | | | |
|---|---|---|---|---|---|
| > 7.625.225 | | TZ | | | |
| 108.04 | | 27 | *108.04 | | 10 |
| Cust | Bid | Bot | CUST | Offer | SOLD |
| 3001 | 5 | 0 | 3007 | 10 | 0 |
| 3002 | 1 | 0 | | | |
| 3003 | 1 | 0 | | | |
| 3001 | 20 | 0 | | | |
| TOTAL | 27 | 0 | | 10 | 0 |

The When State is triggered by a trading command against an uncleared Bid-Offer by an Aggressor who is not the first best original Maker. However, system control will not allow this trading command by the new Aggressor to be instantaneously executed. In accordance with system logic, the trading processor creates a time interval or delay, and thereby provides the first best original Maker time to assess the new situation created by the Aggressor by permitting response to the Uncleared Entry on the Passive Side.

In particular, as noted above, the uncleared status exists for a defined interval—controlled by computer driven timer. It is only during this time interval that a When State can be instituted, which can then only last until resolved by either the action of the first best original Maker on the Active Side or by the expiration of the interval timer within system logic.

During When State processing, the system displays the original Makers—existing with Bid-Offers outstanding prior to the entry of the new Aggressor—and the new trader(s) entering via Hit or Take commands on the pending uncleared Bid-Offer. These Makers and Traders are clearly separated on the screen. (See QUAD 3B below). Importantly, these original Makers are given the opportunity to trade at the new price point established by the Aggressor; multiple Makers from the original list will each have access to take the new price in the order of their priority in the queue. The system will increment through each Maker, if one issues a buy/sell order at their size, they become the Aggressor. If this occurs, the logic departs the When State and can either enter the Workup State or Workdown State depending on whether the new Aggressor takes the entire volume indicated at the conditional prompt.

Once When State processing has been initiated, no trade entries from the Passive Side are permitted. Furthermore, Participants are blocked from entering on the Active Side. Specifically, entries on the uncleared (active) side will come from the new traders, extant traders, or the original Makers. If, for example, a trader has 10 offered and 5 are traded, during the When State the trader preferably can cancel the amount which is not yet committed.

However, if the second interval timer expires without any intercession by the original Makers, the When entries (one or several) will automatically trade—and the original Makers will not take part in this trade. During the time-controlled interval, WTAK flashes on screen to the Makers showing a trade on the uncleared Offer. WHIT will flash for a Hit on an uncleared Bid. During this interval, the size entries for pending Makers are all initialized to zero, and no longer presented at the conditional prompt.

Figure 7:
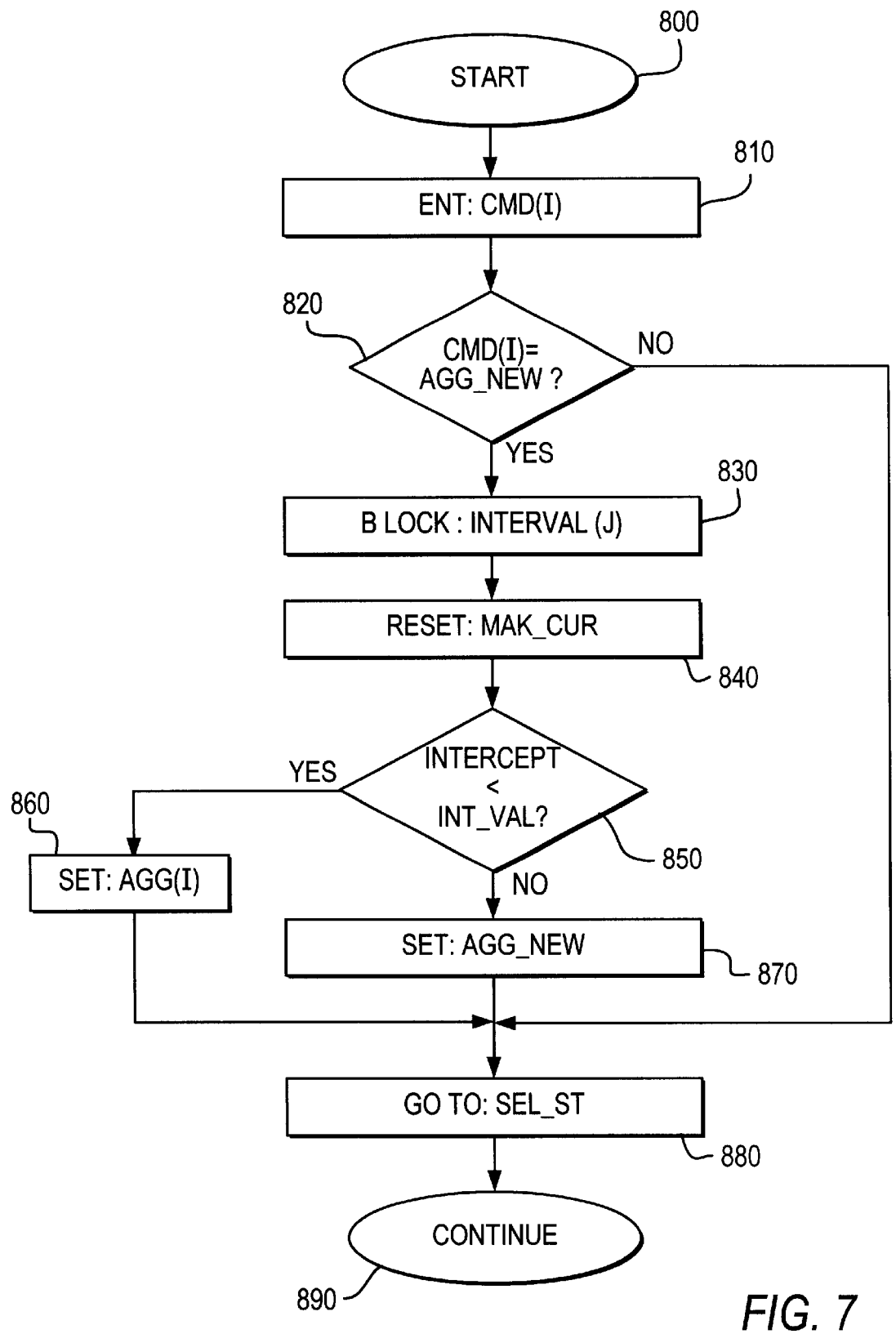
FIG. 7 is a logic diagram for the When State.

When State processing is depicted in FIG. 7 and is triggered by a trading command CMD(I), block 810. Test 820 confirms that the new trading command (Hit or Lift) is from a new Aggressor; if not, logic continues to block 880 and to either Workup or Workdown State.

However, a positive response to Test 820 branches logic to block 830, wherein the market is blocked for a pre-set time interval. At block 840, all then current Active Side Makers are reset to zero. At test 850, the system determines if these Makers intercept the Aggressor before the time interval expires. If yes, the intercepting maker becomes the Aggressor, block 860, with full control over the succeeding trade sequence. If not, the new Aggressor is set, block 870, and logic continues to the next State, block 880.

The following sequence reflects the foregoing system logic. In QUAD 3A below, the Bid-Offer State has two Participants, CUST, 3002 and 3003 each showing bids at 10 million; Participant, CUST 3007 has just placed an uncleared Offer for 1 million. Participant, CUST 3001 wishes to take the new Offer by Participant, CUST 3007—but he can't automatically. In QUAD 3B below, Participant, CUST 3001 attempts to take the Offer by Participant, CUST 3007 forcing the system into the When State and creates an uncleared list for the Active Side (bid here). However, the prequantity of the first two bidders is reduced to zero—as the system logic requires that these bids cannot be enforced at the new price point (108.04+). In this example, the second interval timer provides both original Makers (3002 and 3003) priority over Participant, CUST 3001; with Participant, CUST 3002 retaining overall priority via placement in the queue.

QUAD 3A

| > 7.625.225 | | | TZ | | |
|---|---|---|---|---|---|
| 108.04 | | | 20 | *108.04+ | 1 |
| Cust | Bid | Bot | CUST | Offer | SOLD |
| 3002 | 10 | 0 | 3007 | 1 | 0 |
| 3003 | 10 | 0 | | | |
| | | | | | |
| TOTL | 20 | 0 | | 1 | 0 |

QUAD 3B

| > 7.625.225 | | | TZ | | | |
|---|---|---|---|---|---|---|
| 108.04 | | | 20 | 108.04+ | WTAK | 1 |
| Cust | Bid | Bot | CUST | Offer | SOLD | |
| 3002 | 0 | 0 | 3007 | 1 | 0 | |
| 3003 | 0 | 0 | | | | |
| 3001 | 1 | 0 | | | | |
| | | | | | | |
| TOTL | 1 | 0 | | 1 | 0 | |

Transactions forming a trade take place in accordance with the present invention during one of two trading states, known as the Workup and Workdown States. The Workup State occurs pursuant to Hits or Lifts by an Aggressor taking the entire inventory of volume shown on the Passive Side; once established, the Workup State gives exclusive rights to the trade to the initial traders—who the system recognizes as the current workers. On screen, current workers are highlighted in a defined manner known to other Participants. Current workers control the trade and can submit additional transaction volume to their contra-traders; this is to the exclusion of outside Participants. Current workers on the Active Side of the trade will include the Aggressor, and possibly other traders, below the Aggressor with transactions that move the trade into the "Workup" State by filling residual volume that needs "Workdown". For the Passive Side, an Aggressor that takes the entire size limits current worker status to himself and his counterparty.

The status of current worker dissipates upon entry of "done" by the Participant, or the lapsing of the trading inactivity interval. Again, this interval is a pre-set system parameter triggered via system logic. Absent such termination, current workers can trade almost indefinitely, as long as they continue to respond to their contra-party's size offerings.

Figure 8:
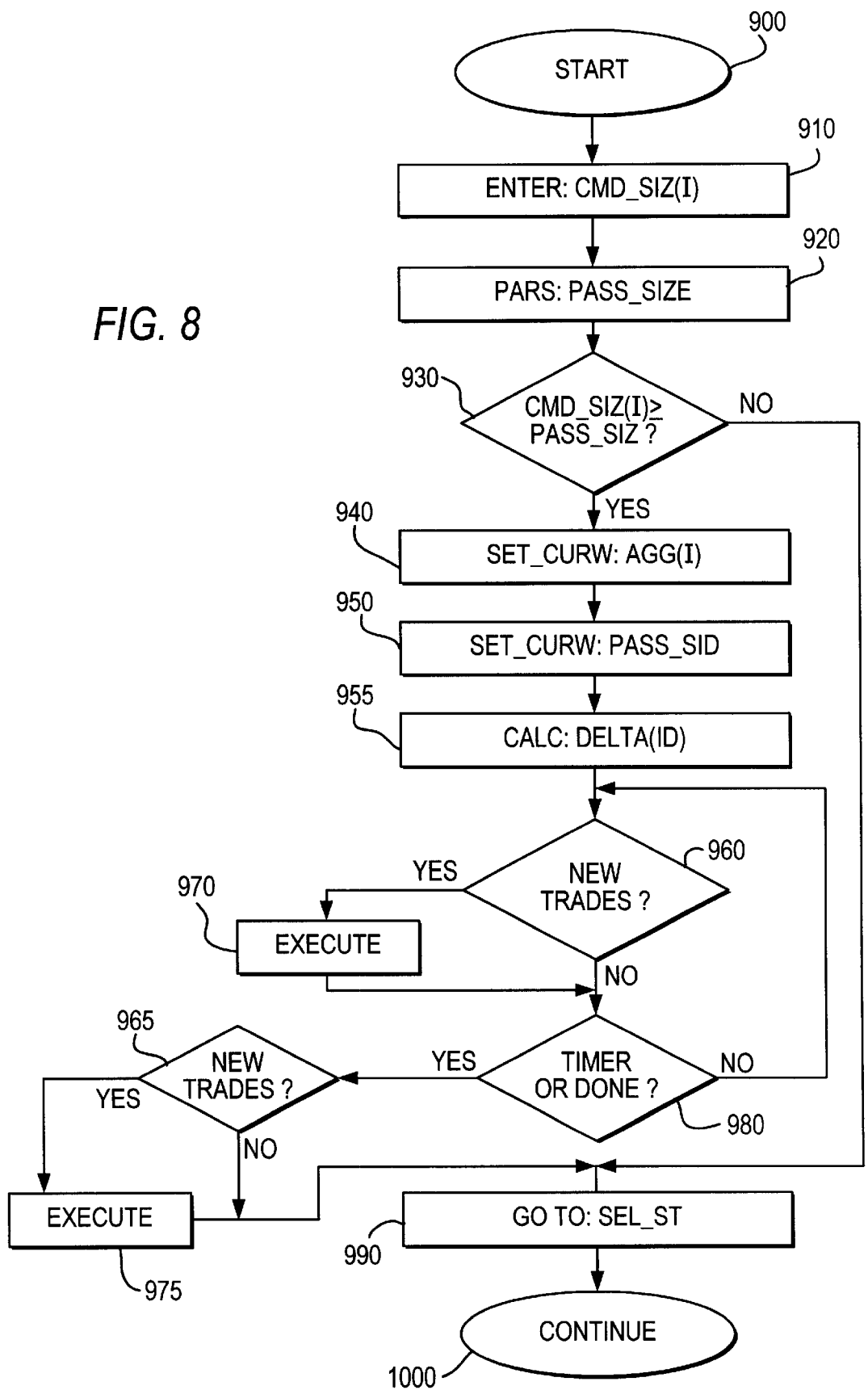
FIG. 8 is a logic diagram for the Workup State.
Figure 9:
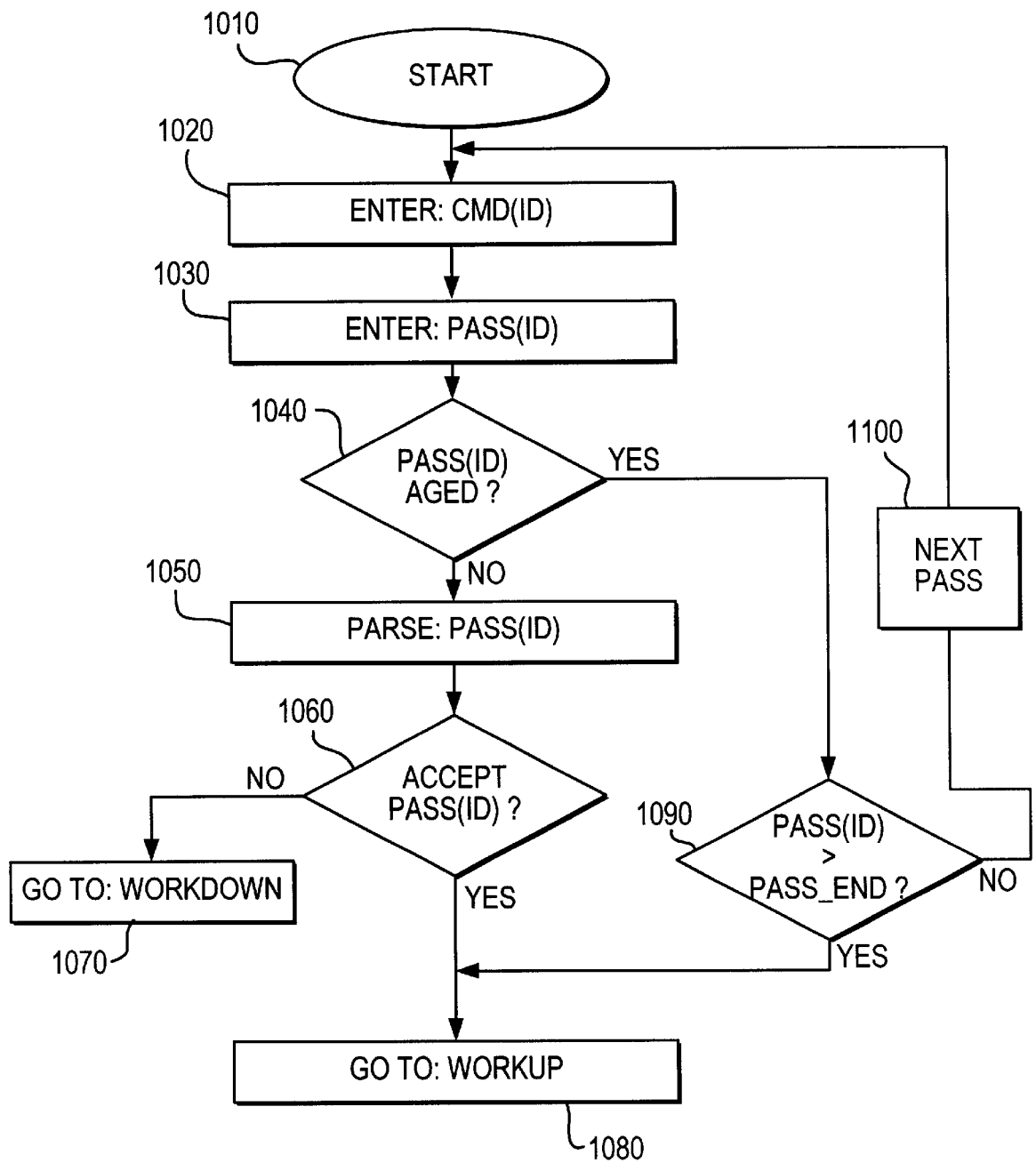
FIG. 9 is a logic diagram for the Second Look State.

The Workup State logic is depicted in FIG. 8 and is principally tied to size and new order data. The Aggressor size is entered as is the Passive Side prior to trade entry; block 910 and 920, respectively. At test 930, the system determines if the Aggressor has taken the entire market offering at time of trade; if "no" to test 930, logic continues to block 990 and ultimately the Workdown State (FIG. 9).

A positive response to Test 930 passes logic to blocks 940 and 950, wherein the current workers are assigned and new trades are entered by the current workers, to the exclusion of other Participants. Under these conditions, and if more than one price queue exists on the Passive Side, the system provides for Price Improvement trading. In this context, the Aggressor has taken trades at multiple price points, indicating a willingness to trade at prices worse than the best Offers-Bids. The system measures the Spread between the best and worst price shown for each contra-trader. A mathematically determined value is set bridging the two price points, e.g., the average of the two prices. This is accomplished at block 955, with the new price difference variable, Delta (ID), for that trader. Given this new price point (a "Price Improvement" from both party's viewpoint) new trades are entered, Test 960, and processed, block 970. This continues until the current workers are done or times out, Test 980. The system then tests for (block 965) and executes (block 975) any new transactions entered (via Hit or Take commands) by new Participants.

The above logic is better understood in the context of specific examples. A system without the Price Improvement feature is shown in QUAD 4A below, with a typical opening Bid-Offer displayed.

QUAD 4A

| > 7.625.225 | | | TZ | | |
|---|---|---|---|---|---|
| 108.04 | | | 16 | 108.05+ | 45 |
| Cust | Bid | BOT | Cust | Offer | SOLD |
| 3001 | 5 | 0 | 3007 | 25 | 0 |
| 3002 | 5 | 0 | 3006 | 10 | 0 |
| 3003 | 1 | 0 | 3005 | 10 | 0 |
| 3001 | 5 | 0 | | | |
| TOTL | 16 | 0 | | 45 | 0 |

Assume that the Bid is Hit by Participant, CUST 3005 selling the entire size (16 million) to the Passive Side. This results in Participant, CUST 3005 as the Aggressor and the contra-trader (Participant, CUST 3001) as the current workers. It is now the Workup State as the Aggressor has taken all initial size from the Passive Side. Those with priority, the Aggressor and first best bidder, are highlighted by video attribute indicated by a rectangular box. See QUAD 4B.

QUAD 4B

| > 7.625.225 | | | TZ | Refno 68119 | |
|---|---|---|---|---|---|
| 108.04 | Hit | | 16 | 108.05+ | 36 |
| Cust | Buy | BOT | Cust | Sell | SOLD |
| 3001 | 0 | 10 | 3005 | 0 | 16 |
| 3002 | 0 | 5 | | | |
| 3003 | 0 | 1 | | | |
| TOTL | 0 | 16 | | 0 | 16 |

Participant, CUST 3002, wishing to continue, adds an additional 5 million size (adding to Participant, CUST 3002's original 5 million), which is displayed as 5 under Buy and 5 under BOT. See QUAD 4C. A new Participant, CUST 3004, now enters a sell order (Hit) for 50 million.

New Participant, CUST 3004 must wait until the current workers are done (via keyboard entry or timer controlled system interval). After this, the system executes for Participant, CUST 3004 the sale of the additional 5 million to Participant, CUST 3002, while leaving 45 million remaining to be sold. See QUAD 4D which shows the display after Participant, CUST 3004 has traded with Participant, CUST 3002. The asterisks next to the entries for Participant, CUST 3001 and Participant, CUST 3005 indicate that these initial traders are done or have timed-out.

QUAD 4C

| > 7.625.225 | | | TZ | Refno 68119 | |
|---|---|---|---|---|---|
| 108.04 | Hit | | 16 | 108.05+ | 36 |
| Cust | Buy | BOT | Cust | Sell | SOLD |
| 3001 | 0 | 10 | 3005 | 0 | 16 |
| 3002 | 5 | 5 | 3004 | 50 | 0 |
| 3003 | 0 | 1 | | | |
| TOTL | 5 | 16 | | 50 | 16 |

| QUAD 4D | | | | | | |
|---|---|---|---|---|---|---|
| > 7.625.225 | | | TZ | Refno 68119 | | |
| 108.04 | Hit | | 21 | 108.05+ | | 36 |
| Cust | Buy | BOT | Cust | Sell | SOLD | |
| *3001 | 0 | 10 | *3005 | 0 | 16 | |
| 3003 | 0 | 1 | 3004 | 45 | 5 | |
| 3002 | 0 | 10 | | | | |
| TOTAL | 0 | 21 | | 45 | 21 | |

As shown in QUAD 4D above, because there is no longer a current worker, no one can control the trade to the exclusion of others.

As can be appreciated, various Participant moves in the market are often fast paced and, on occasion, position changes may occur almost simultaneously. An example of this may be a first Participant hitting a second Participant's bid of a certain size, via the buy/sell all key—an instant after this second Participant has significantly increased the bid size—say from 5 to 20 million. In this situation, the Aggressor, within the system, has now taken much more than he planned. This situation can be very disturbing in a rapidly shifting market.

System logic addresses this problem by creating a supplemental state, known as "Second Look" State. If during this processing, the Passive Side size is increased just prior to a Hit or Lift command, the system discriminates the very recent increase in volume of Offers-Bids from the earlier entries, via an "age timer", i.e., a system interval that tracks the pendency of all Bids and Offers and creates a Second Look State whenever a Hit/Lift (via buy/sell all key) occurs while a Bid-Offer is under, e.g., two seconds old.

The Second Look, however, is limited. The Aggressor must complete the transaction excluding the new, i.e., "unaged" Bid-Offer. This new size is left untraded and others may add more Bids-Offers on this, the Passive Side—but these stay below the line. Even though the Aggressor did not fill the entire size displayed, the Aggressor assumes current worker status and has the right to:

1. Take the new size, creating the Workup State with the contra-trader.
2. Refuse the new size; the Aggressor's refusal (via "done" command) sets the trade into the Workdown State.
3. Take/Hit a "partial" amount and then lose priority, with the system then entering the Workdown State;

The Second Look State is governed by logic depicted in FIG. 9. In this arrangement, the trading command is entered—time stamped at block 1020. The extant passive maker entries are also entered, block 1030 and Test 1040 determines if the Passive Side entries, PASS(ID) are "aged", i.e., not just recently entered. If yes, logic branches to Test 1090, to determine if PASS(ID) is the last entry, PASS_ END. If not, the next one is incremented with logic returning to the sequence start.

A negative response to Test 1040 shifts logic to block 1050 wherein the new entry is parsed; the Aggressor is then given the opportunity to take the new additional size within the trade at Test 1060. The system maintains the commitment of the Aggressor to the original size of the Take or Hit. If accepted, logic branches to Block 1080 and to the Workup State. If negative, logic is shifted to the Workdown State, Block 1070.

These principles are delineated in the following sequence of screen displays in QUADS 5A–5C below, wherein Participants, CUST 3001, 3002, and 3003 are showing 5 million, 1 million, and 1 million, respectively, as having been bought. Just prior to the sell order by Participant, CUST 3007(HIT ALL), CUST 3004 enters with a 1 million size. All size transacts, except this late 1 million as it has not "aged" sufficiently—as measured by system interval timer. This amount remains untraded, and the system enters the Second Look State.

| QUAD 5A | | | | | |
|---|---|---|---|---|---|
| > 7.625.225 | | | TZ | Refno 68119 | |
| 108.04 | Hit | | 7 | | |
| Cust | Buy | BOT | Cust | Sell | SOLD |
| 3001 | 0 | 5 | 3007 | 0 | 7 |
| 3002 | 0 | 1 | | | |
| 3003 | 0 | 1 | | | |
| 3004 | 1 | 0 | | | |
| TOTAL | 1 | 7 | | 0 | 7 |

If Participant, CUST 3007 decides to fill this outstanding 1.0 million size, the state moves out of "Second Look" and into the Workup State with Participant, CUST 3007 and Participant, CUST 3001 as Current Workers. As shown in QUAD 5B, Participant, CUST 3007 has also entered a sell order for a volume of 2 million. The blinking or highlighting of the priority box signifies that the Aggressor is in the Second Look State.

State—with this new trader as the current worker—including obtaining exclusive time if all the remaining size from the original Bid-Offer State is taken.

Figure 10:
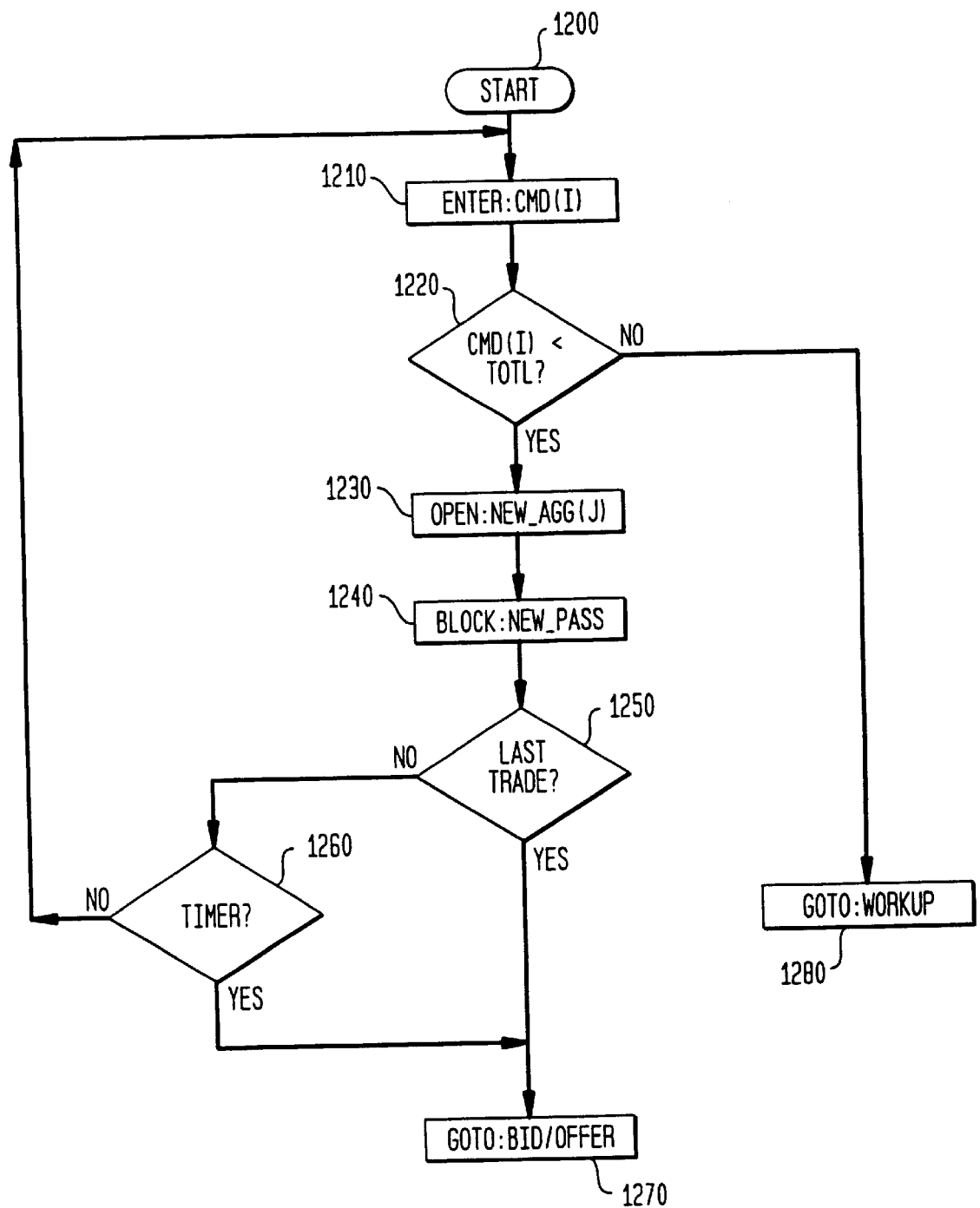
FIG. 10 is a logic diagram for the Workdown State.

The Workdown State allows new Aggressors to complete the remaining un-hit bids on the Passive Side with logic conforming to the flowchart of FIG. 10. In this process, the Trading command; CMD(I), is entered at block 1210. At Test 1220, the system confirms that the trade is for less than

QUAD 5B

| > 7.625.225 | | | TZ | Refno 68119 | |
|---|---|---|---|---|---|
| 108.04 | Hit | | 8 | | 0 |
| Cust | Buy | BOT | Cust | Sell | SOLD |
| 3001 | 0 | 5 | 3007 | 2 | 8 |
| 3002 | 0 | 1 | | | |
| 3003 | 0 | 1 | | | |
| 3004 | 0 | 1 | | | |
| TOTAL | 0 | 8 | | 2 | 8 |

If, however, Participant, CUST 3007 passes, the trade goes to the Workdown State. (QUAD 5C). New Participant, CUST 3005 now enters and is positioned below the line and can only trade after Participant, CUST 3001 is done and Participant, CUST 3004 trades.

the total Passive Side, TOTL. If not, logic branches to block 1280 and is directed to the Workup State.

A positive response to Test 1220 passes logic to block 1230 wherein the system opens trading to new Aggressors,

QUAD 5C

| > 7.625.225 | | | TZ | Refno 68119 | |
|---|---|---|---|---|---|
| 108.04 | Hit | | 7 | | 0 |
| Cust | Buy | BOT | Cust | Sell | SOLD |
| 3001 | 0 | 5 | 3007 | 0 | 7 |
| 3002 | 0 | 1 | | | |
| 3003 | 0 | 1 | | | |
| 3004 | 1 | 0 | | | |
| 3005 | 1 | 0 | | | |
| TOTAL | 1 | 7 | | 0 | 7 |

Another state for trading logic is known as the Workdown State, and it occurs when the original Aggressor takes less than all of the size showing on the Passive Side. The remaining size must be worked down to complete the trade. This rewards those Participants that show Bids-Offers, (their intent to buy/sell), thus providing liquidity in the market. If the original Aggressor returns for the remaining size from the Passive Side, the Workup State is initiated. Another trader from the Active Side may "Workdown" the remaining Passive Side quantity and the trade will go to the Workup to complete the pending Passive Side volume. However, no new Passive Side entries are entitled to exclusive time, block 1240, for the trade duration. Test 1250 confirms the last trade via timer Test 1260; if either results in a "yes", Workdown is terminated and the process returns to the Bid-Offer State.

Importantly, new traders presenting on the Passive Side must wait until all the remaining original size is worked down—and their position is held below the line. This is depicted in QUADS 6A–6C.

| QUAD 6A | | | | | |
|---|---|---|---|---|---|
| > 7.625.225 | | TZ | | | |
| 108.04 | | 15 | *108.04+ | | 25 |
| Cust | Bid | BOT | Cust | Offer | SOLD |
| 3001 | 5 | 0 | 3007 | 25 | 0 |
| 3002 | 10 | 0 | | | |
| TOTL | 15 | 0 | | 25 | 0 |

In QUAD 6A, the Bid-Offer State is depicted with Participant, CUST 3001 showing a bid of 5 million and Participant, CUST 3002, showing a bid of 10 million. As the Aggressor, Participant, CUST 3001, Takes an Offer from Participant, CUST 3007, but only for 5 million of Participant, CUST 3007's showing of 25 million; leaving 20 million on the Passive Side. See QUAD 6B.

| QUAD 6B | | | | | |
|---|---|---|---|---|---|
| > 7.625.225 | | TZ | Refno 68118 | | |
| 108.04 | | 11 | 108.04+ | TAK | |
| Cust | Buy | BOT | Cust | Sell | SOLD |
| *3001 | 0 | 5 | 3007 | 20 | 5 |
| TOTL | 0 | 5 | | 20 | 5 |

At this juncture, if Participant, CUST 3006 enters with a 10 million Offer, it must wait until the original Passive Side clears; Participant, CUST 3006 is thus kept below the line as the remaining size is worked down. See QUAD 6C.

| QUAD 6C | | | | | |
|---|---|---|---|---|---|
| > 7.625.225 | | TZ | Refno 68118 | | |
| 108.04 | | 11 | 108.04+ | TAK | 5 |
| Cust | Buy | BOT | Cust | Sell | SOLD |
| *3001 | 0 | 5 | 3007 | 20 | 5 |
| | | | 3006 | 10 | 0 |
| TOTL | 0 | 5 | | 30 | 5 |

A trade is cleared by a system controlled timer or directly by the Participant, when that price point engenders no further buyers or sellers. The "Clearing" function will resurrect a new Bid-Offer State, retaining original Makers from the Active Side—(unless superceded) and the remaining untraded size from the Passive Side.

As discussed above, the system can provide enhanced performance allowing Price Improvement processing. Price Improvement applies a modified interactive Bid-Offer State and transforms the auction process into a multiple price auction process, where buy or sell orders are executed at one or more prices.

For Price Improvement, the Bid-Offer State reveals that Participants are willing to trade at prices above or below the current best market prices, particularly at sizes that may be significantly larger than the current sizes shown to the marketplace at the best Bid-Offer. All rules of Bid-Offer State apply to each individual price stack or tier under this arrangement. Priority is retained only in the top tier and by the best price, first bidder/offeror. If an Aggressor acts on only one level, then Workup or Workdown State (as previously described) is initiated and limited to that queue's price level.

Even in this single level environment, a trade may be "price improved" by system logic. This may occur, for example, if an Aggressor enters the Workup State. In this State, Price Improvement will be triggered by a passive trader entering a better priced buy/sell. If the initial "best" passive trader matches this new better price, the trade will be consummated, but at a price between (via system defined allocation) this new better price and the original trade price, thus improving the price for both sides of this trade. This is an example of Price Improvement initiated by the Passive Side, via "When" State processing. The same allocation of price would occur if the initial best passive trader declines to match, turning the trade over to the new Passive Side trader.

The foregoing demonstrates that, by becoming an Aggressor in a Price Improvement trade, the Aggressor creates the possibility that the buy or sell order may be executed at a better price than is revealed by the current state of Bids and Offers that are displayed on the system. By doing so, the Aggressor initiates a modified Workup State. (See FIG. 8, discussed supra).

As shown in QUAD 7A, there are three levels of Bids and Offers. The number of levels, of Bids and Offers depicted is a system parameter, and is typically tied to the number of price increments on the Bid and Offer sides, i.e., a cardinal arrangement (e.g., 1/32 increments); an alternative tier arrangement includes an ordinal arrangement (e.g., "top five tiers"). All Participants will be aware that there are four bids for a total of 67 million (2+20+45), ranging from 100.01 down to 100.00 and five offers for a total of 85 million (15+10+60), ranging from 100.02 up to 100.03+. This contrasts with the single queue Bid-Offer State where only two Bids totalling 2 million at 100.01 and two Offers totalling 15 million at 100.02 are shown.

An alternative arrangement applies logic (not shown) that may not disclose all prices and sizes to all Participants. In this case, system logic controls the secondary tiers and buy and sell allocations.

that is created upon the initiation of a Price Improvement trade to be allocated among the Participants.

The Aggressor who initiates the Price Improvement trade is granted protection by allowing contra-trader(s) to buy or sell more at the higher or lower prices shown as the case may be. This is accomplished through system logic that measures the surplus and allocates any available surplus among the trader and the contra-traders. By allowing one or both sides of the trade to execute trades at better prices than their respective revealed intentions, aggressive and/or passive traders are better off. The system benefits the market by creating greater liquidity, improving revealed intentions of bidders and offerors, increasing depth of markets, allowing multiple price trades, and forming the foundation for alternative commission fees.

Once trading commences, state sequencing follows the logic of a single price trade. For example, in the Price Improvement Bid-Offer State, shown in QUAD 7A, a new seller becomes the Aggressor with a command to sell 90 million down to 99.31 (i.e., 99+31/32 nds). In order to improve the seller's ability to sell at the "best price" available, the first best bidder whose priority is ranked on a price and time basis, or by metric comprised therefrom, or including size as well, is given the opportunity to buy additional volumes at an improved price after the 67 million has been Hit, i.e., 2 million sold at 100.01, 20 million sold at 100.00+, and 45 million sold at 100.00. By offering to sell

QUAD 7A

| | Cust | Bid | BOT | | Cust | Offer | SOLD |
|---|---|---|---|---|---|---|---|
| 100.01 | | | 2 | 100.02 | | 15 | |
| | 2001 | 1 | 0 | | 2007 | 5 | 0 |
| | 2002 | 1 | 0 | | 2006 | 10 | 0 |
| | TOTAL | 2 | 0 | | | 15 | 0 |
| 100.00+ | | | 20 | 100.03 | | 10 | |
| | 2005 | 20 | | | 2008 | 10 | 0 |
| | TOTAL | 20 | | | | 10 | 0 |
| 100.00 | | | 45 | 100.03+ | | 60 | |
| | 2012 | 45 | | | 2007 | 20 | |
| | | | | | 2011 | 40 | |
| | TOTAL | 45 | | | | 60 | 0 |
| 100.45x.00 | | 20x.00+ | 2x .01 X | 15x .02 10x.03 60X .03+ | | | |

The logic of the Workup State with Price Improvement encourages Participants to reveal their trading intentions even away from the best price shown by allowing them to participate in a Price Improvement trade if one is initiated. For example, Price Improvement will attach to a Participant by becoming an Aggressor away from the best market prices of 100.01 and 100.02. By revealing this intention, the Aggressor gains first priority for potential price improvement during execution of the volume associated with the price surplus. Priority rankings provide the opportunity for purchases and sales at better prices than the best market of 100.01 and 100.02 by allowing the Buyers or Sellers Surplus a total of 90 million down to 99.31, the seller sells the first 67 million and has "intent" to sell 23 million more. The first best bidder now can execute more at an improved price. The level of improvement is allocated between the bid price of 100.01 (i.e., 100+1/32nd) and the 99.31 reservation price. Thus, if buyer 2001 trades the remaining 23 million with the 99.31 seller, then a Price Improvement trade of 23 hit at 100.00 is consummated. Here, buyer 2001 maintains his/her priority by committing to buy 23 million more at his/her bid level of 100.01. However, the actual trade price is 100.00 providing the buyer with 0.01 (1/32) price improvement and the seller with a like amount 0.01 price improvement over his/her reservation price of 99.31.

The system logic has apportioned the Trader Surplus between the aggressive and passive sides of the trade, benefitting both parties. System logic could also allocate the surplus into alternative logic, e.g., providing the Aggressor with ⅔, all or none of the surplus. The allocation mechanism could also dynamically change depending on the size of the trade or other customer or trade characteristics. The system flashes the sequence of three trades, 2 @ 100.01, 20 @ 100.00+, 68 (45+23) @ 100.00, incorporating highlighting that indicates the sequence is a set of Price Improvement trades. Alternatively, the total trade at the average price could be displayed. At the end of the trade, the system logic returns control to the Bid-Offer State.

Under Price Improvement processing, there are separate mechanisms to present and display multiple Bid-Offers at different price levels. The first option is to remove all out of market Bid-Offers, i.e., all inferior offerings are not displayed. The second option provides the bidder with the choice as to whether his/her inferior bid is left on the display, or removed when topped with a better price. The third option is to display all bids on screen even when topped. This forms a "good till cancel" offering. Another option allows Participants to customize their Bids and Offers under system controlled parameters.

Price Improvement processing also permits priority preserved trading, known as the When State. The When State occurs when a non-priority Participant initiates or responds to a trading command. Under this circumstance, system logic triggers the When State, and this allows the priority bidder, e.g., first best price on the passive market side, to intercede and assume control of the trade. A timer controls the period of time given to the priority bidder during the When State to decide whether to intercede, the original buyer (whose trading command initiated the When State) is placed right behind the priority bidder, and other non-priority buyers are placed in sequence behind the first Aggressor. If, however, the priority bidder does not intercede, logic turns the trade over to the ranked list of buyers and the trade moves to the Workup or Workdown State for completion. By interceding, the first best bidder maintains priority by matching the best price among the When Take trades.

Here, initiating a Price Improvement, the Hit, highlighted by video attribute, is for more size than is shown on the number of tiers of Bids or Offers that are available for price improvement.

In order to provide a greater and more diverse opportunity for price improvement and to protect the price improvement Aggressor, all buy and sell orders received during Exclusive Time are ranked and matched to provide the greatest amount of price protection to the price improvement Aggressor. Because of multi-levels of Bids and Offers, the first best bidder/offeror will maintain priority only if he/she responds at his/her price, or, if necessary, matches the best When Take/Hit price.

As shown in QUAD 7B, Participant CUST 2008 becomes the Aggressor by initiating a Price Improvement trade by committing to sell 90 million down to a price of 99.31. During Exclusive Time, Participant CUST 2001 commits to buy 5 million more at 100.01, Participant CUST 2009 commits to buying 20 million at 100.01+, and Participant CUST 2002 commits to buying 5 million more at 100.01. Customer 2001 does not then match the buy price of 100.01+.

QUAD 7B

| | | | | | | |
|---|---|---|---|---|---|---|
| 100.01 to .00 HIT 67 | | | | | | |
| | Cust | Buy | BOT | Cust | Sell | SOLD |
| 100.01+ | 2009 | 20 | | | | |
| 100.01 | 2001 | 5 | 1 | 2008 | 23 | 67 |
| | 2002 | 5 | 1 | | | |
| TOTAL | | | 2 | | | |
| 100.00+ | 2005 | 0 | 20 | | | |
| TOTAL | | | 20 | | | |
| 100.00 | 2012 | 0 | 45 | | | |
| TOTAL | | | 67 | | | |

CUST 2001 has a priority over Participant CUSTS 2002 and 2009 by having been the original best bidder and commits to buying more at his/her original price. At the end of the Exclusive Time, 20 of the 23 million to be sold is matched with the best buys shown, hence 20 million is sold to 2009. The remaining 3 million is sold to Participant CUST 2001. By not matching the 100.01+ price, CUST 2001 only obtains the 3 million. By maintaining price and time priority, price improvement is obtained and the Aggressor is protected. The trades are shown in QUAD 7C.

| QUAD 7C | | | | | |
|---|---|---|---|---|---|
| 100.00 X 45 | .00 + X23 | .01X22HIT | | | |
| | Cust | Buy | BOT | Cust | Sell | SOLD |
| 100.01 | 2001 | | 1 | 2008 | | 22 |
| | 2002 | | 1 | | | |
| | 2009 | | 20 | | | |
| TOTAL | | | 22 | | | 22 |
| 100.00+ | 2005 | | 20 | 2008 | | 23 |
| | 2001 | | 3 | | | |
| TOTAL | | | 23 | | | |
| 100.00 | 2012 | | 45 | 2008 | | 45 |
| TOTAL | | | 45 | | | 45 |
| TOTAL | | | 90 | | | 90 |

Figure 12:
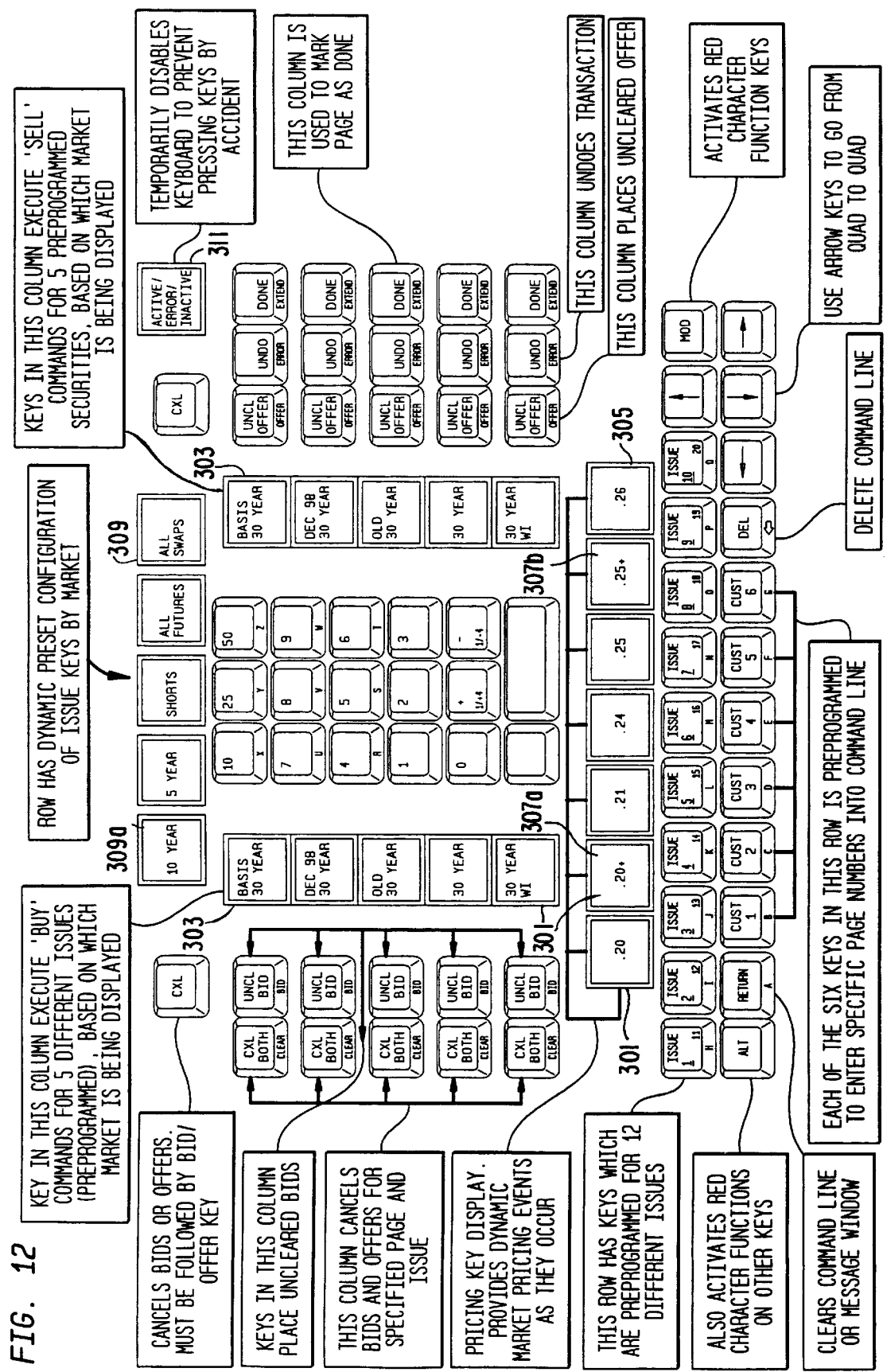
FIG. 12 is a drawing of an interactive keyboard useful for practicing the invention.

The Participants interact with system logic during Price Improvement trading via an input device. Various input devices can be used as exemplified by the specialized keyboard depicted in FIG. 12. The keyboard includes special LCD keys, whose function and display is directly tied to the state of the Trading Processor. The keyboard has two vertical rows of 5 LCD keys each and a horizontal row of 7 LCD keys. The horizontal row of LCD keys dynamically display the three different price levels available on both the Bid and Offer Sides. This row is called the "Price Row". This display updates in real-time as prices change in the Trading Processor. The center key in this row shows a price incrementor value. The most appropriate incrementor value is determined by the Trading Processor, based on the range of the Spread between the best and worst markets. This incrementor value is also updated real-time as prices change. The bid prices travel to the left of the keyboard from the center key in order of best to worst. Similarly, the Offer prices travel to the right. As different price levels appear in the Price Improvement Bid-Offer State, they are displayed in the Price Row. To facilitate data entry and quickly react to the market, the Participant simply needs to press one of the LCD keys to chose which price level he wants to trade. After selecting the price, the Participant will choose one of the action keys represented by the vertical row of the LCD keys. If the Participants wants to trade below or above the prices present in the market at that point, Participant can use the incrementor key to indicate how far below or above he wants to go.

The capabilities of the foregoing keyboard arrangement can be realized in several alternate embodiments. For example, the input commands can be arranged on a touch screen, touch pad transducer (e.g., "mouse"). Other vehicles for inputting commands include voice command, voice activated navigation, and other "location" devices that may be exchanged as is, per se, well known in the art. The use of the term key is meant to include a command or data entry trigger, i.e., a device or switch, that when activated accomplishes a particular task.

Figure 11:
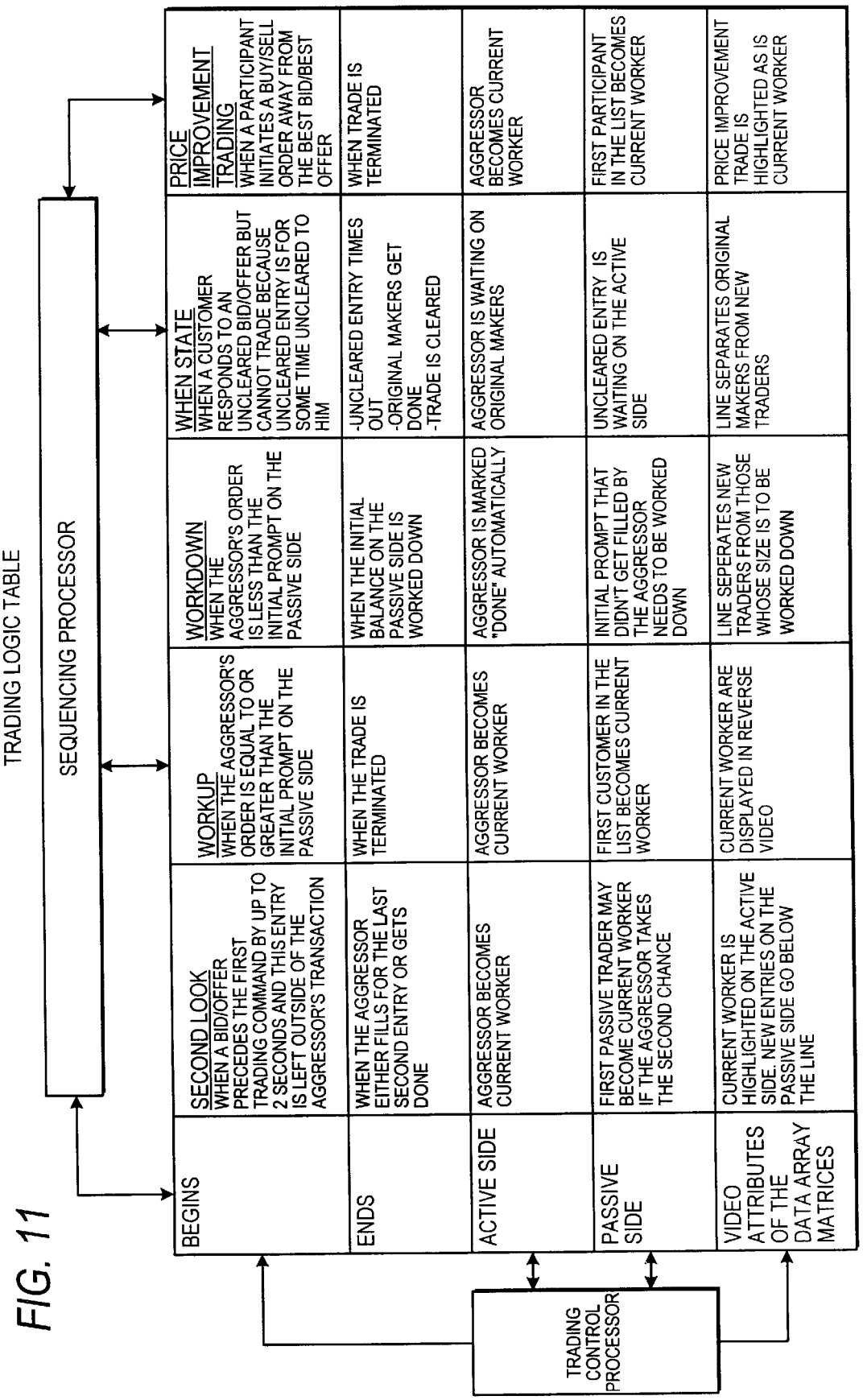
FIG. 11 is a trading logic summary table.

The logic associated with the five states discussed herein is summarized in tabular form in FIG. 11. Features of the foregoing system have resulted in a dramatic increase in efficiency and reduction of order errors.

Figure 3A:
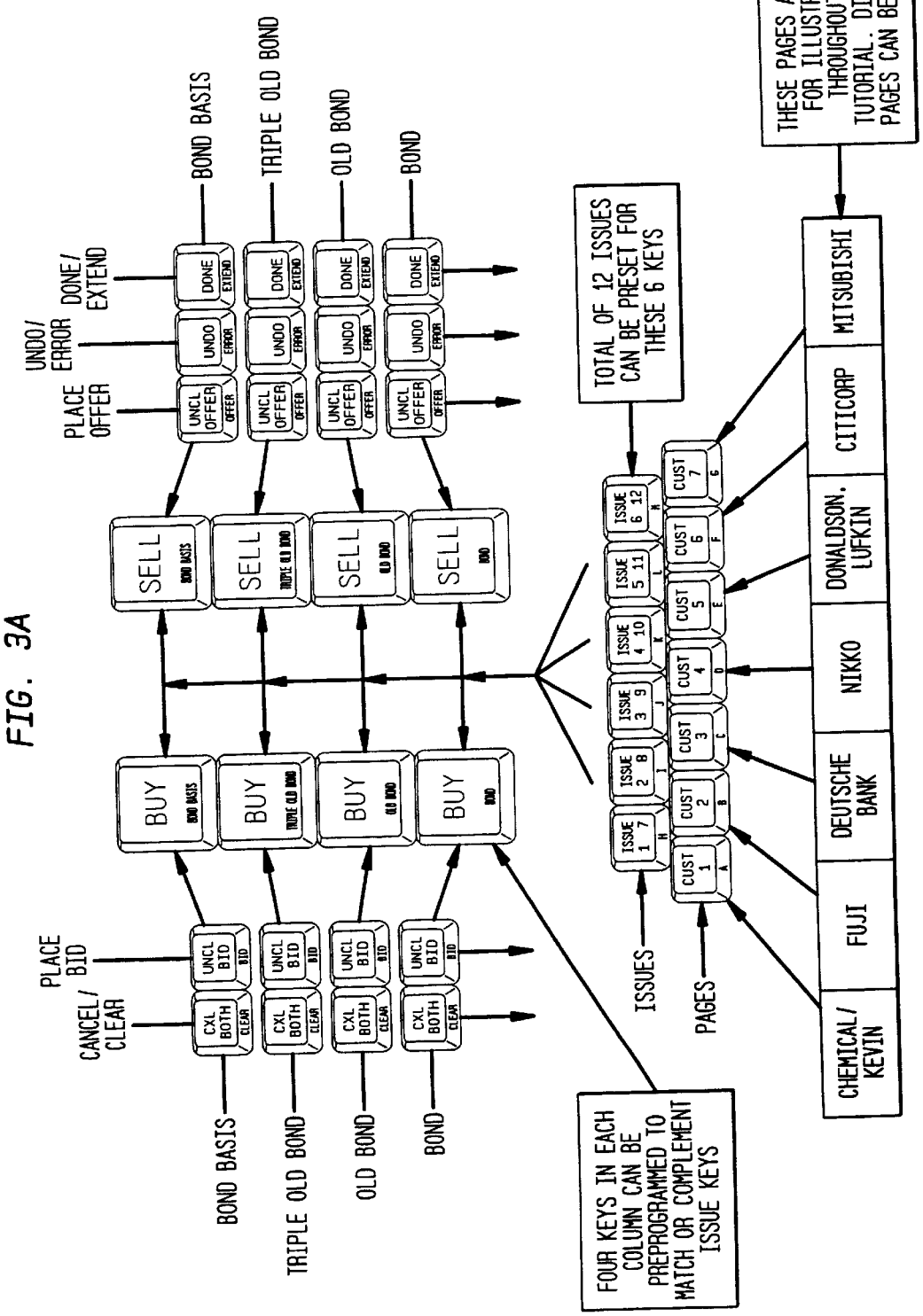
FIGS. 3A–B depicts the salient features of the dedicated keypad.
Figure 3B:
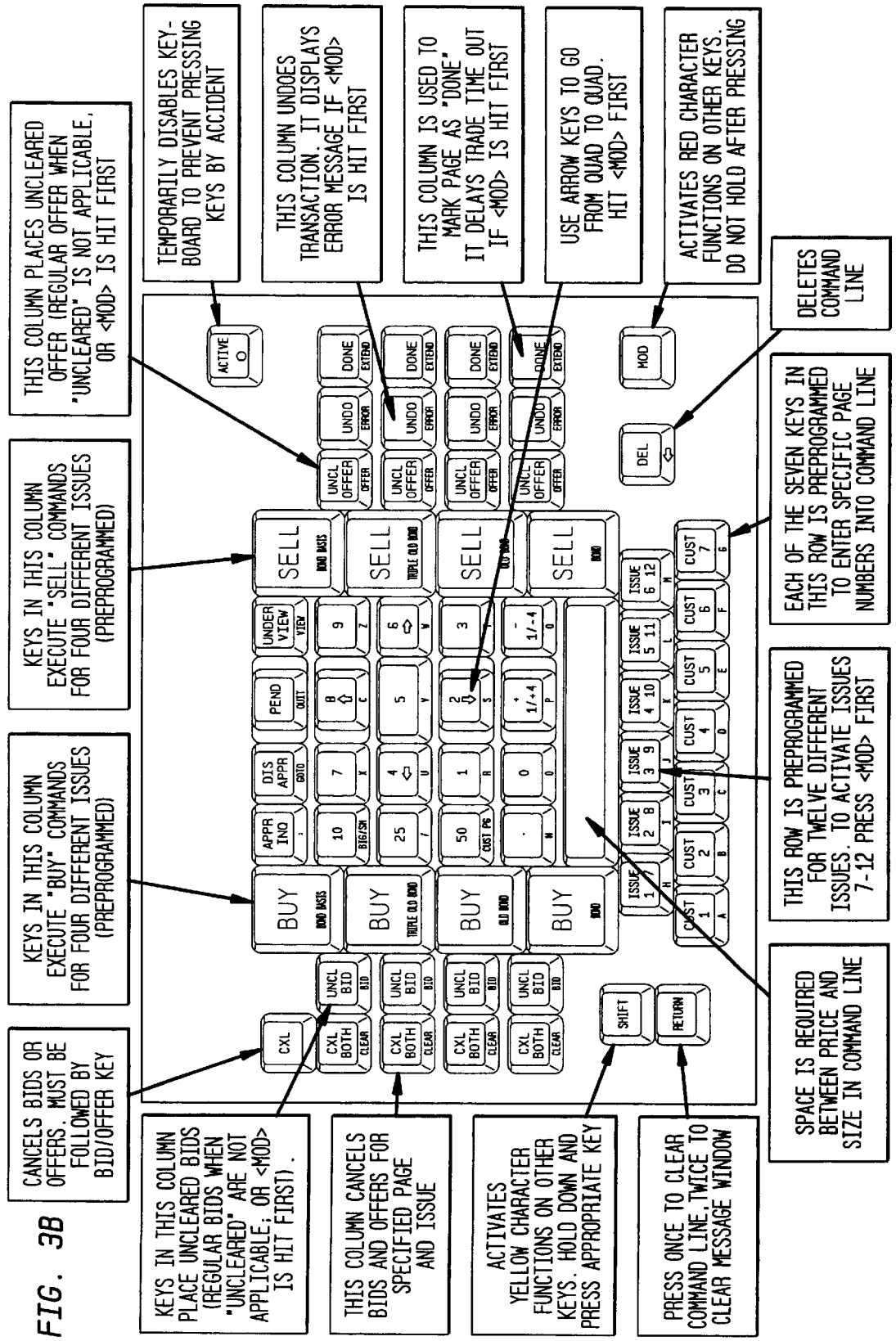

The often frenetic environment of Bidding, Offering, and Trading and the entry of commands on the preferred dedicated keypad, shown in FIGS. 3A–B, and the likelihood of Participants changing their minds all contribute to the possibility that a trade has been made in error. More particularly, errors can arise due to incorrect entries into the system, a miscommunication between Participant and the like. These errors can often force a "principal" Participant into an unintended position during a trade.

This invention preferably provides ways for the Participant to effectively "undo" a trade, either by canceling a pending order, or rolling-back executions during a trade State. As shown in FIGS. 3A–B, the keypad provides CANCEL, DONE, and UNDO keys to facilitate this process. The function of these keys when the system is in a particular state is described below, it being understood that the names given these keys are arbitrary and any input means can be used to effect the desired action(s).

In the Bid-Offer State, the CANCEL command removes a maker's existing markets from one or more instruments.

In the When State, CANCEL removes a maker's markets only if there are no pending active BUY or SELL orders against it. Also, DONE removes a potential Aggressor, as well as trade Participants, from trading lists before orders are matched.

During the Workdown State, CANCEL removes any remaining passive maker's markets. DONE performs the same function as CANCEL removes and also allows the Passive trading Participants in the Workdown State to remove themselves from trading lists, thereby effectively removing their committed sizes before the system has had a chance to execute them. UNDO functions to "unroll" the trade and reduce the size shown to Participants if executed during a predefined time period after the initial trade. Additionally, the UNDO function proportionately reduces the amount traded by all passive Makers. The restriction of a predefined time period discourages a trader from taking unfair advantage of this correction facility. Analogously, if no more than one trader participated in the trade, then the UNDO function causes the trader to join the contra-side for the size desired to be undone. The UNDO function can be invoked at any time by any Participant, on the Active Side or the Passive Side; the system applies controlling logic to maintain the fairness of this trading protocol.

During the Workup State, a Participant can use the DONE function to remove himself from being a Participant from the Active Side or the Passive Side, or both sides simultaneously, regardless of the size traded or solicited. Thus, the DONE function removes the Participant from the trade. The UNDO function can also roll back the trade provided that the first active trader has executed this function within a predefined time period following the trade. If the UNDO function is not invoked during this predefined period, or the trader is not the first active trader, then the trader is entered in the queue to buy or sell on the contra-side immediately. Preferably, the trader is placed at the top of the list so that the UNDO function can be effectively invoked immediately, provided there is a contra-trader. Most preferably, the rights of the first active and passive traders will be maintained to assure fairness.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A data processing system for implementing trading of select items, said data processing system utilized by Participants through a communication platform that defines the ability of Participants to engage in said trading, said system comprising:
   a plurality of communication links to Participants to transmit trading information on price and transaction attributes of said select items and to transmit Participant interactive inputs in response to said information, said inputs including Bid, Offer, and trade execution commands; and
   a central server, linked to, and in communication with said Participants, said server programmed with trading control logic comprising a protocol of trade sequences directed to implementing interactive bidding, offering, and trading commands directed by Participants, wherein trading can proceed on multiple price levels in one or more trading states, said states defining the Participants' abilities to engage in item trading activity.

2. The trading system of claim 1, wherein said protocol is defined by a stored program comprising a logic structure that defines conditions where a Participant buys or sells the selected item through Hit and/or Take commands at a set price or set of prices.

3. The trading system of claim 2, wherein said logic structure ranks bids and/or offers.

4. The trading system of claim 3, wherein said system states comprise a Bid-Offer State and a trading Workup State.

5. The trading system of claim 4, wherein said trading states further comprise a Workdown State.

6. The trading system of claim 5, wherein said trading states further comprise a Second Look State.

7. The trading system of claim 6, wherein said trading states further comprise a When State.

8. The trading system of claim 1, wherein Participants are provided access to said information through a workstation and a selectively arranged screen display.

9. The trading system of claim 8, wherein said display further comprises a presentation of a bid side and/or an offer side of the market.

10. The trading system of claim 9, wherein said display further provides information as to the size of uncleared or cleared bids and/or offers.

11. The trading system of claim 10, wherein Participants are notified in real time of the status of their Hits, Takes, and/or Price Improvement Hits or Takes.

12. The trading system of claim 9, wherein said display further provides a queue of Participants organized in groups corresponding to their respective participation in the bid and/or offer side of the market.

13. The trading system of claim 12, wherein said Participants queue is ordered by time of entry.

14. The trading system of claim 13, wherein said Participants queue order is further based on price.

15. The trading system of claim 14, wherein said display provides information regarding the entry of a Hit and/or Take by a Participant.

16. The trading system of claim 12, wherein said Participants queue is ordered by a metric derived from among time entry, size, and/or price.

17. The trading system of claim 12 wherein said Participants' entries are controlled by size of entry limits.

18. The trading system of claim 8 wherein a hierarchy of Participants can control and limit the actions of other Participants.

19. The trading system of claim 8, wherein bid-offer clearance times and execution priority times are system or manually controlled.

20. The trading system of claim 8, that allows for the addition or reduction, in price, of a Bid or Offer and stated size volume.

21. The trading system of claim 8, that allows for the input of increases of Bids and/or Offers and Hits and Takes size volumes on a gross or incremental basis.

22. The trading system of claim 8, that allows queued Participants to increase the size of their open Bid or Offers, by joining the bottom of the queue for that additional amount.

23. The trading system of claim 8, that allows inputs to decrease the amount of a Bid or Offer, canceling Bids or Offers lowest in a queue first.

24. The trading system of claim 8, that allows inputs to Clear an Uncleared Bid or Offer before the interval timer automatically clears the Bid or Offer.

25. The trading system of claim 8, that allows inputs to Cancel one side of a Bid or Offer, if the Participant is both a Bidder and Offerer.

26. The trading system of claim 8, that allows for an Uncleared Bid or Offer to become a Cleared Bid-Offer and to become open to immediate execution by any input of a Hit or Take command for the specific item when a clearing interval timer reaches zero.

27. The trading system of claim 8, that allows for all Bids and/or Offers to be entered Clear, if a clearing interval timer is set to zero.

28. The trading system of claim 8, that allows for all Bids and/or Offers to be entered Clear, if there is no counter Bid and/or Offer at the time of input.

29. The trading system of claim 8, that allows the input of a Hit or Take order that is less than the amount of the contra-Bid or Offer, and automatically stops an inputting Participant from further buying or selling.

30. The trading system of claim 8, that allows the Participant to Hit or Take a Cleared Bid or Offer to trade the entire amount showing in a single keystroke.

31. The trading system of claim 8, that allows the input of a Hit or Take order that is larger than the total contra- Bid or Offer amount.

32. The trading system of claim 8, that allows for the creation of select item Hit and Take each having different timers.

33. The trading system of claim 8, that establishes a contingent Passive Hit and/or Take timer.

34. The trading system of claim 8, that allows for the Passive Hit and/or Take input corresponding to Hit or Take orders, resetting a timer at each volume increment.

35. The trading system of claim 8, that allows for Hit or Take inputs to queue by time entered.

36. The data processing system of claim 8, wherein at least one said workstations comprises an input device having keys with indicia that are dynamically altered in response to trading conditions.

37. The data processing system of claim 36, wherein key indicia is altered electronically in real time.

38. The data processing system of claim 36, wherein key indicia indicates the price of a select item.

39. The data processing system of claim 36, wherein key indicia indicates the difference between the corresponding cash market price and its derivative market price of a select item.

40. The data processing system of claim 39, wherein key indicia indicates the difference in corresponding prices and/or yields among two or more select items.

41. The data processing system of claim 39, wherein key indicia indicates the price of select items.

42. The data processing system of claim 39, wherein key indicia indicates the yield of select items.

43. The data processing system of claim 39, wherein key indicia indicates the market of an issue to be traded.

44. The data processing system of claim 39, wherein key indicia displays whether the keyboard is enabled or disabled.

45. The data processing system of claim 39, wherein said workstation comprises a display screen with one or more quad indicia of market information.

46. The data processing system of claim 36, wherein said input device has at least one key for undoing a function.

47. The data processing system of claim 46, wherein the input device has at least four keys for at least one trading function.

48. The data processing system of claim 47, wherein each four keys for each function are arranged in a symmetrical orientation.

49. The data processing system of claim 48, wherein the columns of keys for placing an offer, undoing a function, and completing a transaction are disposed to the right of the buy and sell columns of keys.

50. The data processing system of claim 48, wherein a numeric keypad is disposed between the buy and sell columns of a keyboard.

51. The data processing system of claim 36, wherein a keyboard has at least one key for each of the following trading functions: canceling a bid, placing a bid, executing a buy, executing a sell, placing an offer, undoing a function, and completing a transaction.

52. The trading system of claim 1, wherein said protocol is controlled by a stored program comprising a logic structure that defines conditions where a Participant becomes a trader and conditions where a trader and other Participants may participate in a trade and obtain price improvements from their declared buy and/or sell orders.

53. The trading system of claim 52, where price improvements occur when existing and/or additional Participants enter select item trading position changes or commands.

54. The data processing system of claim 52, wherein said communication link includes an input device.

55. The data processing system of claim 54, wherein said keyboard has at least one key for each of the following trading functions: canceling a bid, placing a bid, executing a buy, executing a sell, placing an offer, undoing a function, and completing a transaction.

56. The data processing system of claim 55, wherein a keyboard has sets of up to four keys for each of said functions.

57. The data processing system of claim 56, wherein each set of keys for each function are arranged in a column.

58. The data processing system of claim 57, wherein the columns keys for canceling a bid and placing a bid are disposed on a keyboard to the left of the buy and sell columns of keys.

59. The data processing system of claim 58, wherein the columns of keys for placing an offer, undoing a function, and completing a transaction are disposed to the right of the buy and sell columns of keys.

60. The data processing system of claim 59, wherein a numeric keypad is disposed between the buy and sell column keys.

61. The method of claim 54, wherein a keyboard includes a key dedicated to a particular select item.

62. The data processing system of claim 54, wherein a keyboard includes a plurality of keys each dedicated to a particular select item.

63. The data processing system of claim 52, wherein a keyboard includes a key dedicated to a particular select item.

64. The data processing system of claim 52, wherein a keyboard includes a plurality of keys each dedicated to a particular select item.

65. The trading system of claim 1, wherein said trading states are a function of commands entered by said Participants.

66. The trading system of claim 1, wherein said trading states include select time interval control for uncleared bids/offers.

67. The trading system of claim 1, wherein Participant validation is monitored and confirmed in real time.

68. The trading system of claim 1, wherein Participants are notified of current validation in real time.

69. The trading system of claim 1, wherein Participants may be prevented from trading access at set time and/or system controlled intervals.

70. The trading system of claim 1, wherein Participants are notified in real time of the status of their Bids and Offers.

71. The trading system of claim 1, wherein Participants can post sequences of bids or offers at multiple prices.

72. The trading system of claim 1, wherein said item is a financial instrument.

73. The trading system of claim 1, wherein said item is a futures contract.

74. The trading system of claim 1, wherein said item is an options contract.

75. The trading system of claim 1, wherein said item is an equity instrument.

76. A computer trading system for use by multiple Participants wherein one or more Participants operate a selectively configured input device for data entry and receive information about market conditions from a display, said system comprising:

a data processor having associated control logic in communication with said input device, said control logic providing a trading protocol wherein trading can proceed on multiple price levels in one or more trading states that establish trading hierarchy among Participants and that allows a trade entry by a Participant to take place on select items; wherein:

said input device comprises one or more trade execute keys, individually assigned to a particular item available for trading, said input device further comprising a plurality of Participant entry keys assigning trade commands to a particular Participant for entry of Bids, Offers, Hits, and Takes; and said display presents a trading information profile that includes pending offers and bids at select price points and sizes.

77. The trading system of claim 76, wherein said input device provides single keystroke entry for a Bid-Offer command.

78. The trading system of claim 77, wherein said trading states include Price Improvement Trading at one or multiple price points.

79. The trading system of claim 77, wherein said data processor provides for an interactive Bid-Offer state wherein Participants' price(s) and size(s) are displayed on said display.

80. The trading system of claim 79, wherein said Bid-Offer State is terminated by a Participant's entry of a Hit or a Take command.

81. The trading system of claim 79, wherein said Bid-Offer State is moved to a "When" State by a new Participant's entry of a Hit or Take.

82. The trading system of claim 76, wherein said display presents information on trade transactions and Participant's access to said information is contingent on system trading state and/or interval timers.

83. A method of select item trading in an electronic interactive trading system that provides a predetermined trading protocol, said method comprising:
providing a Price Improvement Bid-Offer System State wherein Participants participate by entry of bids, offers, and volume information;
queuing said Participants' Bids and Offers by price level and/or time;
receiving Hits and/or Takes from said Participants responding to these bids-offers that cause Participants to enter a Price Improvement Trade State; and
completing trade transactions as established during the Price Improvement Trade State wherein said trade transaction can be completed at multiple prices.

84. The method of claim 83, wherein said Trade State is further delineated into a Workdown and Workup State.

85. The method of claim 84, wherein said Workup State is created by a single Participant hitting or taking all pending size within a system and/or Participant-controlled designated range.

86. The method of claim 84, wherein said Workdown State is created by a single Participant hitting or taking all or less than all pending size within a system and/or Participant-controlled designated range.

87. The method of claim 84, wherein a keyboard includes a key dedicated to a particular select item.

88. The method of claim 84, wherein a keyboard includes a plurality of keys each dedicated to a particular select item.

89. The method of claim 83, wherein said Bid-Offer State is characterized by system creation of a plurality of pricing queues.

90. The method of claim 83, wherein said trading protocol is encoded in programming logic controlling said computer system.

91. The method of claim 83, further comprising an input device that includes a keypad with dynamically changing trade keys.

92. The method of claim 83, wherein the multiple trade prices are determined by sharing Trader Surplus as determined by system controlled logic.

93. The method of claim 83, wherein said Hits and/or Takes are entered using a keyboard.

94. A trading computer system for electronic trading of items offered for sale via electronic communication between a plurality of Participants, said system comprising:
network interconnection establishing communication between a plurality of computers and one or more computer servers;
one or more computer servers capable of receiving inputs from said plurality of computers and of responding to said plurality of computers in accordance with a trading defining protocol;
said plurality of computers individually including at least an output system for presenting trading information in a format comprehensible by said Participants, and an input system for transferring commands from said Participants to said server(s) regarding trading positions and the entry of executed trades that can be at multiple price levels in one or more trading states in response to said trading information.

95. The trading computer system of claim 94, wherein said output system on said plurality of computers includes a display for visual presentation of said trading information.

96. The trading system of claim 94, wherein said output system on said plurality of computers includes audio presentation of said trading information.

97. The trading system of claim 94, wherein said trading defined protocol includes logic that controls access to and entry of electronic trading commands in accordance with a plurality of trading states.

98. The trading system of claim 97, wherein said states include a Bid-Offer State that provides trading information to said plurality of computers regarding current items and prices thereof and permits Participants to input trading commands including a Hit or Take of a pending bid or offer.

99. The trading system of claim 98, wherein said Bid-Offer State further provides one or more pricing queues for organizing Participants based on bid or offer pricing and time.

100. The trading system of claim 99, wherein said states include a Workup state established by said server upon entry of a Hit or Take of all bids or offers, respectively.

101. The trading system of claim 100, wherein said Workup state determines a number of Participants provided trade command access for a predetermined interval.

102. The trading system of claim 101, wherein said server establishes extended trading access during the Workup state at price levels based on last bid or offer positions of Participants.

103. The trading system of claim 102, wherein said states further comprise a Workdown state and said server computer establishes said Workdown state upon entry of a trading order for less than all of pending bids or offers in said trading information.

104. The trading system of claim 94, wherein said item is a financial instrument.

105. The trading system of claim 94, wherein said item is a fixed income instrument.

106. The trading system of claim 94, wherein said item is a U.S. Treasury debt instrument.

107. The trading system of claim 94, wherein said item is a derivative financial product.

108. The trading system of claim 94, wherein said item is a physical commodity.

109. The trading system of claim 94, wherein said item is selected from the group consisting of art, automobiles, electricity, pollution rights, carbon dioxide, and wine.

110. The trading system of claim 94, wherein said item is an equity/debt hybrid instrument.

111. The trading system of claim 94, wherein said item is a municipal debt instrument.

112. The trading system of claim 94, wherein said item is a preferred stock.

113. The trading system of claim 94, wherein said item is a convertible bond.

* * * * *

UNITED STATES PATENT AND TRADEMARK OFFICE
CERTIFICATE OF CORRECTION

PATENT NO. : 6,850,907 B2
DATED : February 1, 2005
INVENTOR(S) : Lutnick et al.

It is certified that error appears in the above-identified patent and that said Letters Patent is hereby corrected as shown below:

Title page,
Item [56], References Cited, OTHER PUBLICATIONS,
"Massimb, M.N. et al.,", reference, change "Analysis" to -- Analysts --.
"Bollinger, J.," reference, change "Declration" to -- Declaration --.
"Belsie, Laurent," reference, change "us fo" to -- use of --.
"Colleman, Zach" reference, change "Colleman" to -- Coleman --.
"Coggan, Philip," reference, insert -- " -- before "Weekend" and -- " -- after "invest?".
"Dyson, Ester," reference, insert -- , -- after "Forbes".
"Ferris, Stephen P.," reference, italicize "Institutions and Money".
"Francioni, Reto," reference, change "Competitve" to -- Competitive --.
"Hamon, Jacques, et al.," reference, change "Competive" to -- Competitive --.
"Handa, Puneet, et al.," reference, change "Order-Drive" to -- Order-Driven --.
"Harris, Lawrence," reference, italicize "Trading Systems".
"Killian, Raymond L., et al.," reference, change "competitve" to -- competitive --.
"Leinweber, David et al.," reference, delete second occurrence of "The Journal of Investing".
"McCabe, Kevin et al.," reference, change "Competitve" to -- Competitive --.
"Sales, Robert," reference, insert -- , -- after "Technology".
"Shahan, Catherine," reference, change "HOlds" to -- Holds -- and change "Auctions" to -- Auction --.
"Taylor, John," reference, change "Herarld" to -- Herald --.
"Toner, Ann," reference, change "Herlad" to -- Herald --.
"Varian, Hal R.," reference, change "Commierce" to -- Commerce --.
"Waters, Richmond," reference, change "Lodnon" to -- London --.
"Williams, Monci Jo," reference, should be before "Wilson, Robert," reference.
"Black-box Global Trading a Challenge to Regulators," reference, change "Regulatros," to -- Regulators, --.
"Cathay Pacific Airways Auctions A Boeing…" reference, insert -- " -- before "Bid" and -- "-- after "Auction,".
"Cattlemen Tune In to Video Auctions," reference, change "Herlad" to -- Herald --.
"Computers & Automation" reference, change "III" to -- Ill -- and change "Quicklky" to -- Quickly --.
"Dallas Gold & Silver Exchange, Inc." reference, change "Acitivities" to -- Activities --.
"Illiquid Securities Auction Organizers…" reference, insert -- " -- before "Illiquid"; insert -- " -- after "Kickoff," and change "Taday's" to -- Today's --.
"ONSALE…" reference, change "bargain" to -- Bargain --.
"Liberty Brokerage" reference (3rd occurrence), change "Brokearage" to -- Brokerage --.
"eSpeed, Inc...Plaintiffs' Responses..." reference, "eSpeed" should begin a new entry at margin.

UNITED STATES PATENT AND TRADEMARK OFFICE
CERTIFICATE OF CORRECTION

PATENT NO. : 6,850,907 B2
DATED : February 1, 2005
INVENTOR(S) : Lutnick et al.

It is certified that error appears in the above-identified patent and that said Letters Patent is hereby corrected as shown below:

<u>Title page (cont'd)</u>,
"eSpeed, Inc...Supplemental Answers..." reference, "eSpeed, Inc." should begin the new entry at margin.
Delete "Charles Schwab & Co., Inc.," reference (duplicate entry).

<u>Column 2</u>,
Line 9, delete "," after "independent".

<u>Column 5</u>,
Line 2, insert -- and -- before "contingent"; delete "and" before "flags"; delete "such" after "warning".
Line 15, insert -- , -- after "alternatively".
Line 41, insert -- , -- after "bid".
Line 56, change "depicts" to -- depict --.

<u>Column 6</u>,
Line 34, delete 2nd occurrence of "the".

<u>Column 10</u>,
Line 21, insert -- , -- before "e.g.".

<u>Column 11</u>,
Line 67, delete "are rewarded".

<u>Column 12</u>,
Line 2, insert -- are rewarded -- after "Participants".
Line 57, change "totals" to -- TOTALS --.

<u>Column 19</u>,
Line 34, change "age timer" to -- "age" timer --.

<u>Column 20</u>,
Line 20, change "State;" to -- State --.

<u>Column 23</u>,
Line 61, change "superceded" to -- superseded --.

<u>Column 25</u>,
Line 12, delete "," after "levels".

UNITED STATES PATENT AND TRADEMARK OFFICE
CERTIFICATE OF CORRECTION

PATENT NO.    : 6,850,907 B2
DATED         : February 1, 2005
INVENTOR(S)   : Lutnick et al.

It is certified that error appears in the above-identified patent and that said Letters Patent is hereby corrected as shown below:

Column 29,
Line 48, change "Participants" to -- Participant --.
Line 49, insert -- the -- before "Participant".

Column 30,
Line 48, delete "removes".

Signed and Sealed this

Fourteenth Day of March, 2006

JON W. DUDAS
*Director of the United States Patent and Trademark Office*